(12) United States Patent
Wax et al.

(10) Patent No.: US 7,289,481 B2
(45) Date of Patent: Oct. 30, 2007

(54) WLAN CAPACITY ENHANCEMENT BY CONTENTION RESOLUTION

(75) Inventors: Mati Wax, Haifa (IL); Ruby Tweg, D.N. Misgav (IL); Aviv Aviram, Haifa (IL); Evgeni Levitan, Haifa (IL); Amit Freiman, Haifa (IL); Einat Ophir-Arad, D.N. Misgav (IL); Alex Podgaetsky, Kiryat Yam (IL); Hovav Elzas, Ra'anana (IL)

(73) Assignee: Wavion Ltd., Yokneam (IL)

( * ) Notice: Subject to any disclaimer, the term of this patent is extended or adjusted under 35 U.S.C. 154(b) by 450 days.

(21) Appl. No.: 11/082,114

(22) Filed: Mar. 16, 2005

(65) Prior Publication Data

US 2005/0213556 A1 Sep. 29, 2005

Related U.S. Application Data

(60) Provisional application No. 60/556,262, filed on Mar. 24, 2004.

(51) Int. Cl.
*H04Q 7/24* (2006.01)
*H04B 1/38* (2006.01)
*H04J 3/24* (2006.01)

(52) U.S. Cl. .................. 370/338; 370/349
(58) Field of Classification Search ............. 370/338, 370/349; 455/561
See application file for complete search history.

(56) References Cited

U.S. PATENT DOCUMENTS 6,067,290 A   5/2000  Paulraj et al.
6,240,098 B1  5/2001  Thibault et al.
2004/0028121 A1  2/2004  Fitton
2005/0047384 A1*  3/2005  Wax et al. ................ 370/338
2005/0213556 A1*  9/2005  Wax et al. ................ 370/349

FOREIGN PATENT DOCUMENTS

EP  0 926 912  6/1999
EP  0 926 916  6/1999

(Continued)

OTHER PUBLICATIONS

ANSI/IEEE Standard 802.11, Part 11: Wireless LAN Medium Access Control (MAC) and Physical Layer (PHY) Specifications, 1999.

(Continued)

*Primary Examiner*—William D. Cumming
(74) *Attorney, Agent, or Firm*—Welsh & Katz, Ltd.

(57) ABSTRACT

A method for communication includes receiving signals transmitted over the air by first and second mobile stations on a common frequency channel in a wireless packet network, the signals carrying first and second data packets transmitted by the first and second mobile stations, respectively, the first and second data packets comprising respective, first and second headers. The received signals are processed so as to identify the first header. Responsively to the identified first header, signal values corresponding to at least a portion of the first data packet are reconstructed, and the reconstructed signal values are subtracted from the received signals so as to produce a modified signal. The modified signal is processed in order to identify the second header. The first and second data packets are demodulated using the identified first and second headers.

62 Claims, 9 Drawing Sheets

FOREIGN PATENT DOCUMENTS

WO      WO 96/22662      7/1996
WO      WO 2004/010573      1/2004

OTHER PUBLICATIONS

Moghadam Kaveh, "A CDMA Interference Canceling Receiver with an Adaptive Blind Array", IEEE J. Selected Areas, Communications, vol. JSAC-16, No. 8, Oct. 1998, pp. 1542-1554.

Cao Yuan, et al., "A New Scheme for DS-CDMA Detection Combining Smart Antennas and Parallel Interference Canceller", Communication Technology Proceedings, 2000, WCC-ICCT 2000, International Conference on Beijing, China Aug. 21-25, 2000, pp. 156-159.

Nazar S N et al., "An Adaptive Parallel Interference Canceler Using Adaptive Blind Arrays", VTC 2002-Fall, 2002 IEEE 56th, Vehicular Technology Conference Proceedings, Vancouver, Canada, Sep. 24-28, 2002.

Je Gil Koo Ed, Institute of Electrical and Electronics Engineers: "Performance analysis of an iterative group-wise parallel interference cancellation for multiuser detection of coherent W-CDMA stsem", Globecom '02, 2002—IEEE Global Telecommunications Conference, Conference proceedings, Taipei, Taiwan, Nov. 17-21, 2002.

\* cited by examiner

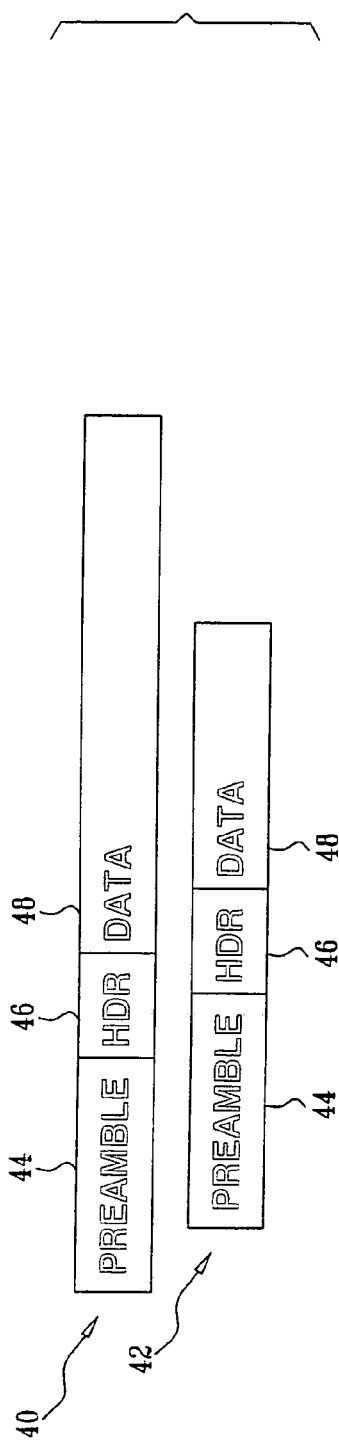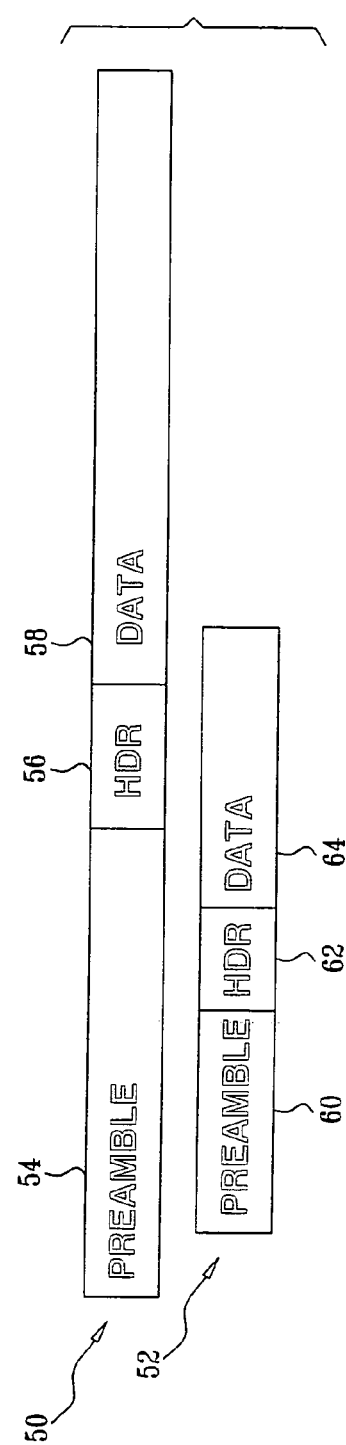

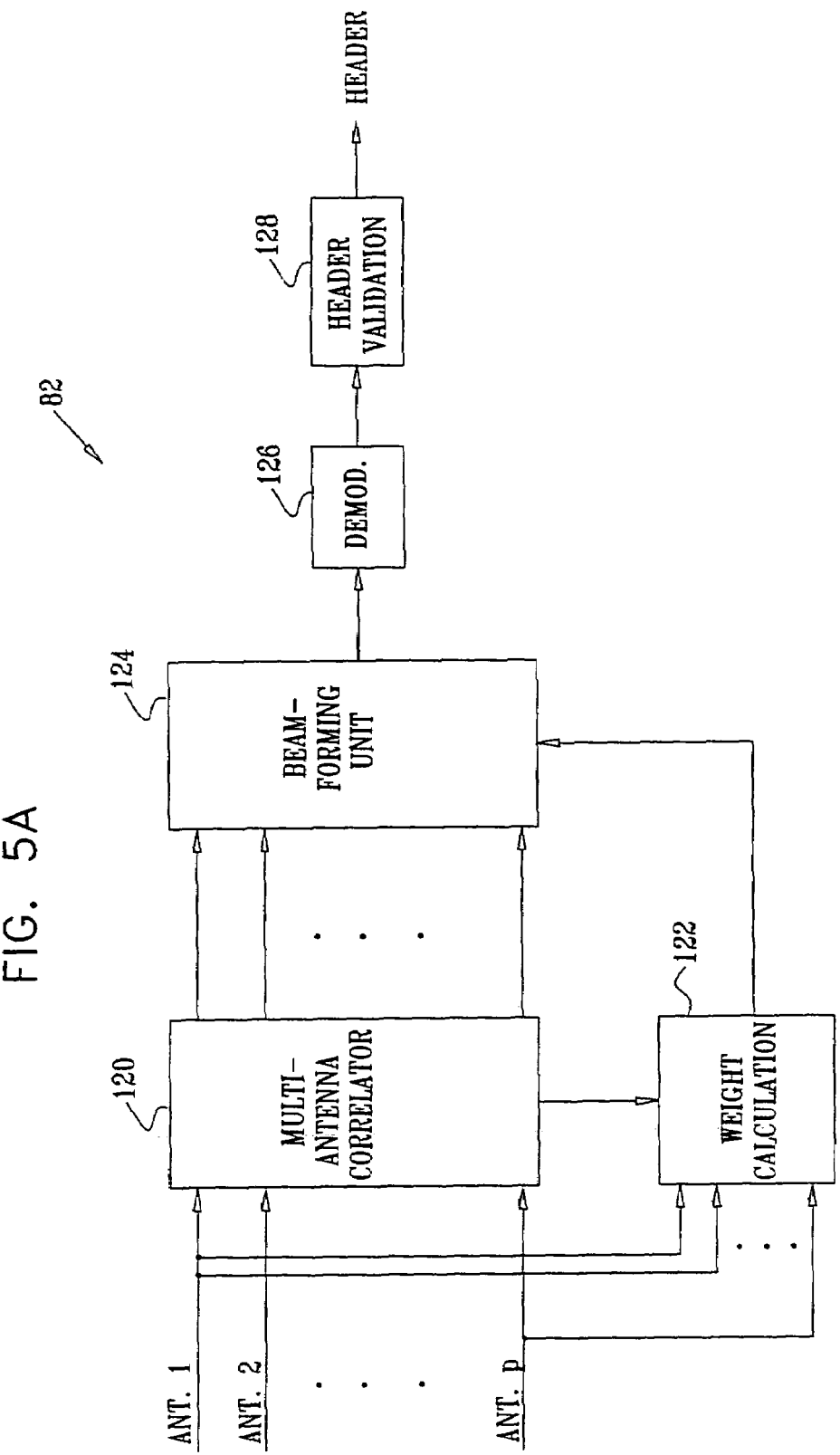

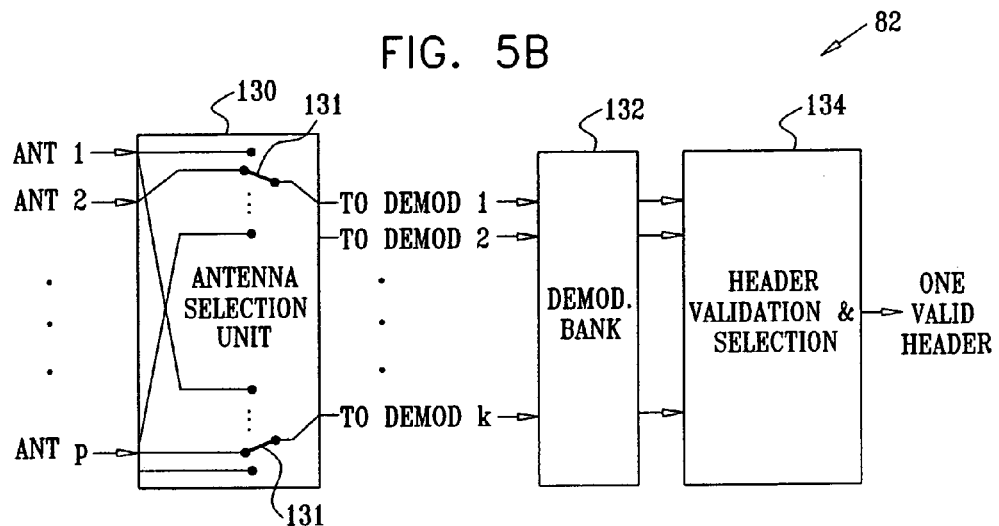
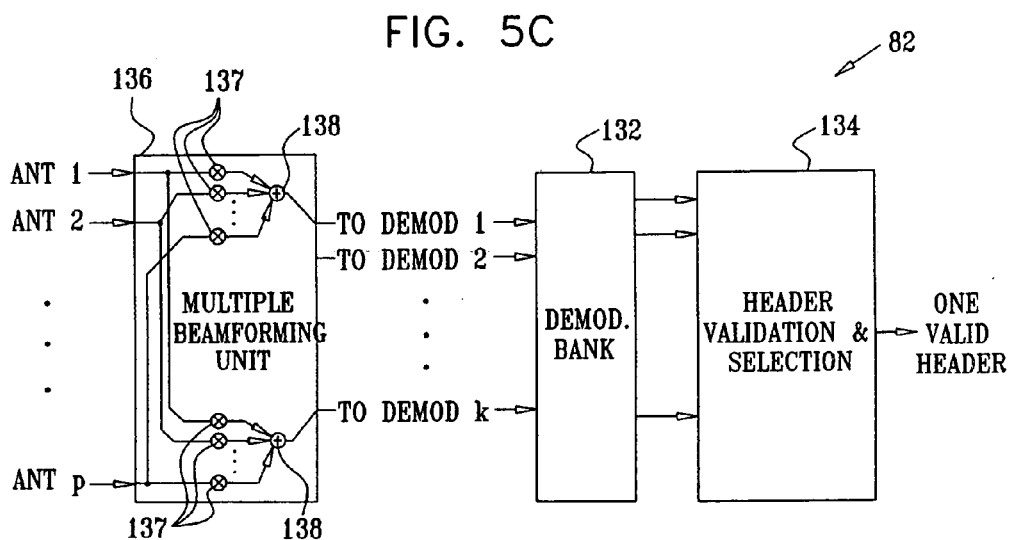

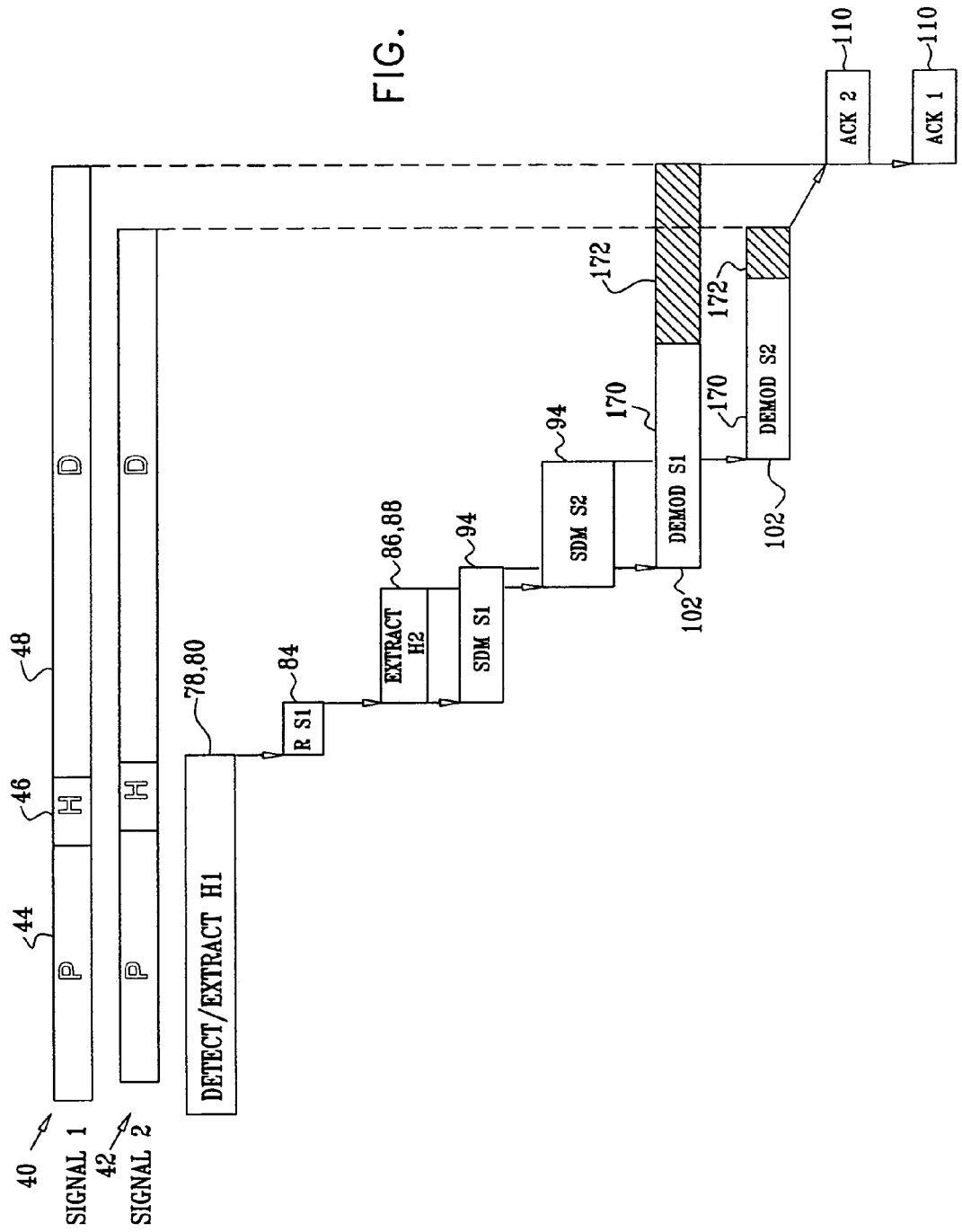

WLAN CAPACITY ENHANCEMENT BY CONTENTION RESOLUTION

CROSS-REFERENCE TO RELATED APPLICATION

This application claims the benefit of U.S. Provisional Patent Application 60/556,262, filed Mar. 24, 2004, which is incorporated herein by reference.

FIELD OF THE INVENTION

The present invention relates generally to wireless communications, and specifically to methods and devices for improving the performance of wireless local area networks.

BACKGROUND OF THE INVENTION

Wireless local area networks (WLANs) are gaining in popularity, and the demand for WLAN bandwidth is growing. The original WLAN standards, such as IEEE 802.11, were designed to enable communications at 1-2 Mbps in a band around 2.4 GHz. More recently, IEEE working groups have defined the 802.11a, 802.11b and 802.11g extensions to the original standard, in order to enable higher data rates. The 802.11a standard, for example, provides data rates up to 54 Mbps over short distances in a 5 GHz band, while 802.11b defines data rates up to 11 Mbps in the 2.4 GHz band. The newer 802.11g standard permits data rates up to 54 Mbps in the 2.4 GHz, and is also backward-compatible with legacy 802.11b products. In the context of the present patent application and in the claims, the term "802.11" is used to refer collectively to the original IEEE 802.11 standard and all its variants and extensions, unless specifically noted otherwise.

As WLAN use increases, so does the probability that two mobile stations in the same WLAN will attempt to transmit signals simultaneously on the same frequency channel. If a WLAN access point receives signals simultaneously from two sources of similar strength on the same frequency channel, it is generally unable to decipher either signal. Both stations must then retransmit their signals, leading to a waste of bandwidth and degradation of the communication rate. The 802.11 standard provides a mechanism for avoidance of such contention based on clear channel assessment (CCA), which requires a station to refrain from transmitting when it senses other transmissions on its frequency channel. In practice, however, this mechanism does not prevent multiple stations from beginning their transmissions at about the same time. Furthermore, there are cases in which the physical layout of the WLAN environment prevents one mobile station from sensing the signals transmitted by another mobile station on the same channel, but still permits signals from both mobile stations to be received simultaneously by a given access point.

SUMMARY OF THE INVENTION

Embodiments of the present invention provide methods and devices that permit a receiver to distinguish and decode two (or more) packets that are received over the air simultaneously in a wireless communication network. In the context of the present patent application and in the claims, the term "simultaneous" means that the time intervals during which the packets arrive at the receiver overlap at least in part. Aspects of the present invention can be used to enhance the effective capacity of the network by preventing loss of data due to contention of packets from multiple transmitters, and thus avoiding the need for transmission when such contention occurs.

In some embodiments of the present invention, an access point in a WLAN receives signals transmitted from at least two mobile stations on a common frequency channel. The access point comprises multiple antennas, and the access point processes multiple signal inputs that are each made up from one or more of the individual signals received by the different antennas. The signals received from the mobile stations carry data packets, which have headers that follow a known pattern, as determined by the applicable WLAN communication protocol. The access point processes the input signals (in the form of a digitized sample stream) so as to identify and extract one of the headers. When two mobile stations transmit packets simultaneously, so that the signals from the mobile stations are mixed together, the header that is identified and extracted at this stage is typically (although not necessarily) the header of the packet carried by the stronger signal.

Using the extracted header, the access point reconstructs a signal based on at least a portion of the corresponding data packet. The access point then subtracts the reconstructed signal from the original received signals in order to produce a modified signal (i.e., a modified stream of digital samples). In other words, the signal that carried the first packet to be identified and demodulated is effectively "peeled" out of the signal inputs. The access point then examines the modified signal in order to determine whether it contains the header of a second data packet—as will be the case when the first and second mobile stations transmitted packets simultaneously. If the access point identifies a second header in the modified signal, it repeats the steps of header extraction and demodulation with respect to the second packet.

Based on the second packet, a second signal may be reconstructed and peeled out of the modified signal in the same manner as the first packet was peeled out of the original signal. The access point may then process the resulting signal, as described above, in order to extract a third packet transmitted simultaneously from yet another mobile station, and so forth.

In some embodiments of the present invention, the extracted headers are used in computing beamforming weights, which are then applied to spatially filter the signal inputs in order to separate out the individual signals. These filtered signals are demodulated in order to recover the first and second packets.

The embodiments described hereinbelow make use particularly of features of the 802.11 standards in order to enhance the performance of WLANs of this type. The principles of the present invention, however, may similarly be applied to wireless packet communication networks of other types.

There is therefore provided, in accordance with an embodiment of the present invention, a method for communication, including:

receiving signals transmitted over the air by first and second mobile stations on a common frequency channel in a wireless packet network, the signals carrying first and second data packets transmitted by the first and second mobile stations, respectively, the first and second data packets including respective, first and second headers;

processing the received signals so as to identify the first header;

responsively to the identified first header, reconstructing signal values corresponding to at least a portion of the first data packet;

subtracting the reconstructed signal values from the received signals so as to produce a modified signal;

processing the modified signal in order to identify the second header; and demodulating the first and second data packets using the identified first and second headers.

In disclosed embodiments, the network includes a wireless local area network (WLAN), and the signals are transmitted by the mobile stations to an access point in the WLAN in accordance with IEEE standard 802.11.

In some embodiments, processing the received signals includes detecting an element of the first packet in the received signals, recovering a synchronization of the first packet responsively to the detected element, and decoding at least a portion of the first header using the recovered synchronization. Typically, detecting the element includes detecting a preamble of the first packet.

In a disclosed embodiment, detecting the preamble includes finding a correlation between the received signals and a known pattern of the preamble, and recovering the synchronization includes locating a peak value of the correlation, and determining a timing of the preamble based on the peak value. Typically, receiving the signals includes digitizing the received signals so as to generate at least one sequence of digital samples, and arranging the digital samples in a reception matrix, and finding the correlation includes defining a vector corresponding to the known pattern of the preamble, and computing the correlation of the reception matrix with the vector. In one embodiment, finding the correlation includes computing a covariance of the reception matrix.

Additionally or alternatively, the preamble belongs to one of a plurality of preamble types that are used in the WLAN, and finding the correlation includes correlating the received signals with each of the plurality of preamble types.

Further additionally or alternatively, processing the modified signal includes detecting the preamble of the second packet in the modified signal, recovering the synchronization of the second packet responsively to the detected preamble of the second packet, and decoding the second header using the recovered synchronization.

In some embodiments, receiving the signals includes receiving the signals using multiple antennas, which generate respective signal inputs responsively to the signals, and processing the received signals includes combining the signal inputs to generate a combined signal, and identifying the first header in the combined signal. Typically, combining the signal inputs includes assigning respective weights to the signal inputs, and summing the signal inputs responsively to the respective weights. In a disclosed embodiment, assigning the respective weights includes computing the respective weights responsively to a correlation between the signals inputs and a known preamble of the first data packet.

Additionally or alternatively, combining the signal inputs includes generating a plurality of different combined signals, and processing the received signals includes identifying respective headers in one or more of the different combined signals, and selecting one of the identified headers as the first header.

In some embodiments, receiving the signals includes receiving the signals using multiple antennas, and providing a plurality of signal inputs responsively to the signals received by the multiple antennas, and processing the received signals includes identifying respective headers in one or more of the signal inputs, and selecting one of the identified headers as the first header. In one embodiment, providing the plurality of signal inputs includes receiving a respective one of the signal inputs from each of the antennas. In an alternative embodiment, providing the plurality of signal inputs includes applying a beamforming process to the signals received from the multiple antennas so as to generate the plurality of signal inputs, such that each of the signal inputs includes a different weighted combination of the signals received from the multiple antennas.

In disclosed embodiments, reconstructing the signal values includes estimating original signal values generated by the first mobile station in transmitting at least the portion of the first data packet, estimating a transfer function of a propagation channel traversed by the signals, and filtering the original signal values responsively to the transfer function in order to determine the reconstructed signal values. Typically, estimating the original signal values includes finding a set of beamforming weights responsively to a correlation between the received signals and the first header, and applying the beamforming weights to the received signals.

In some embodiments, receiving the signals includes receiving the signals using multiple antennas, which generate respective signal inputs responsively to the signals, and estimating the original signal values includes finding a maximal ratio combination of the signal inputs responsively to the estimated transfer function. Typically, estimating the transfer function includes estimating a respective individual transfer function for each of the multiple antennas, and finding the maximal ratio combination includes equalizing each of the signal inputs responsively to the respective individual transfer function, and combining the equalized signal inputs. In one embodiment, combining the equalized signal inputs includes weighting each of the equalized signal inputs responsively to the respective individual transfer function, and summing the weighted equalized signal inputs.

Additionally or alternatively, finding the maximal ratio combination includes applying a respective matched filter to each of the signal inputs so as to generate filtered inputs, combining the filtered inputs, and equalizing the combined inputs responsively to the estimated transfer function.

In an alternative embodiment, receiving the signals includes receiving the signals in multiple frequency bins, and estimating the transfer function includes finding a frequency-domain transfer function in each of the frequency bins, and filtering the original signal values includes filtering the original signal values in the frequency domain responsively to the frequency-domain transfer function.

Typically, estimating the transfer function includes finding a correlation of the first header with the received signals.

In a disclosed embodiment, the method includes, responsively to the identified second header, reconstructing further signal values corresponding to at least a portion of the second data packet, subtracting the reconstructed signal values from the modified signal so as to produce a further modified signal, and processing the further modified signal in order to identify a third header of a third packet, which was transmitted by a third mobile station simultaneously with at least one of the first and second packets.

In some embodiments, receiving the signals includes receiving the signals using multiple antennas, which are configured to generate a plurality of signal inputs responsively to the signals, and demodulating the first and second data packets includes computing first and second beamforming weights for application to each of the signal inputs, combining the signal inputs responsively to the first and second beamforming weights so as to generate first and second filtered signals, and processing the first and second filtered signals, respectively, so as to demodulate the first and second data packets. Typically, computing the first and second beamforming weights includes determining the first and second beamforming weights responsively to the first and second headers, respectively.

Alternatively or additionally, receiving the signals includes sampling the signals at a predetermined sample rate, and processing the first and second filtered signals includes processing at least a part of the signals at an accelerated rate, which is greater than the sample rate, so as to complete demodulation of the first and second data packets within a predetermined time limit following transmission of each of the packets. Typically, the method includes returning respective acknowledgments to the first and second mobile stations within the predetermined time limit, responsively to having completed the demodulation of the data packets.

In a disclosed embodiment, the method includes generating respective first and second acknowledgments, responsively to having demodulated the first and second data packets, and transmitting the first and second acknowledgments, subject to the first and second beamforming weights, to the first and second mobile stations.

There is also provided, in accordance with an embodiment of the present invention, apparatus for communication, including:

a radio receiver, which is adapted to receive signals transmitted over the air by first and second mobile stations on a common frequency channel in a wireless packet network, the signals carrying first and second data packets transmitted by the first and second mobile stations, respectively, the first and second data packets including respective, first and second headers; and signal processing circuitry, which is adapted to process the received signals so as to identify the first header, and responsively to the identified first header, to reconstruct signal values corresponding to at least a portion of the first data packet and to subtract the reconstructed signal values from the received signals so as to produce a modified signal, and which is further adapted to process the modified signal in order to identify the second header, and to demodulate the first and second data packets using the identified first and second headers.

In a disclosed embodiment, the apparatus includes multiple antennas, which are configured to generate a plurality of signal inputs responsively to the signals, wherein the signal processing circuitry is adapted to compute first and second beamforming weights for application to each of the signal inputs, to combine the signal inputs responsively to the first and second beamforming weights so as to generate first and second filtered signals, and to process the first and second filtered signals, respectively, so as to demodulate the first and second data packets. The apparatus further includes an analog/digital converter, which is operative to sample the signals at a predetermined sample rate, and the signal processing circuitry is adapted to process at least a part of the first and second filtered signals at an accelerated rate, which is greater than the sample rate, so as to complete demodulation of the first and second data packets within a predetermined time limit following transmission of each of the packets. Typically, the apparatus also includes transmission circuitry, wherein the signal processing circuitry is adapted to generate respective first and second acknowledgments, responsively to having demodulated the first and second data packets, and to cause the transmission circuitry to transmit the first and second acknowledgments, subject to the first and second beamforming weights, to the first and second mobile stations.

The present invention will be more fully understood from the following detailed description of the embodiments thereof, taken together with the drawings in which:

BRIEF DESCRIPTION OF THE DRAWINGS

FIGS. 2A and 2B are timing diagrams that schematically illustrate data packets that are transmitted over the air simultaneously in a WLAN;

FIGS. 5A, 5B and 5C are block diagrams that schematically illustrate a header extraction circuit used in an access point, in accordance with embodiments of the present invention;

FIG. 7 is a timing diagram that schematically illustrates a sequence of steps involved in processing two data packets that are received simultaneously in a WLAN, in accordance with an embodiment of the present invention.

DETAILED DESCRIPTION OF EMBODIMENTS

System Characteristics

Figure 1:
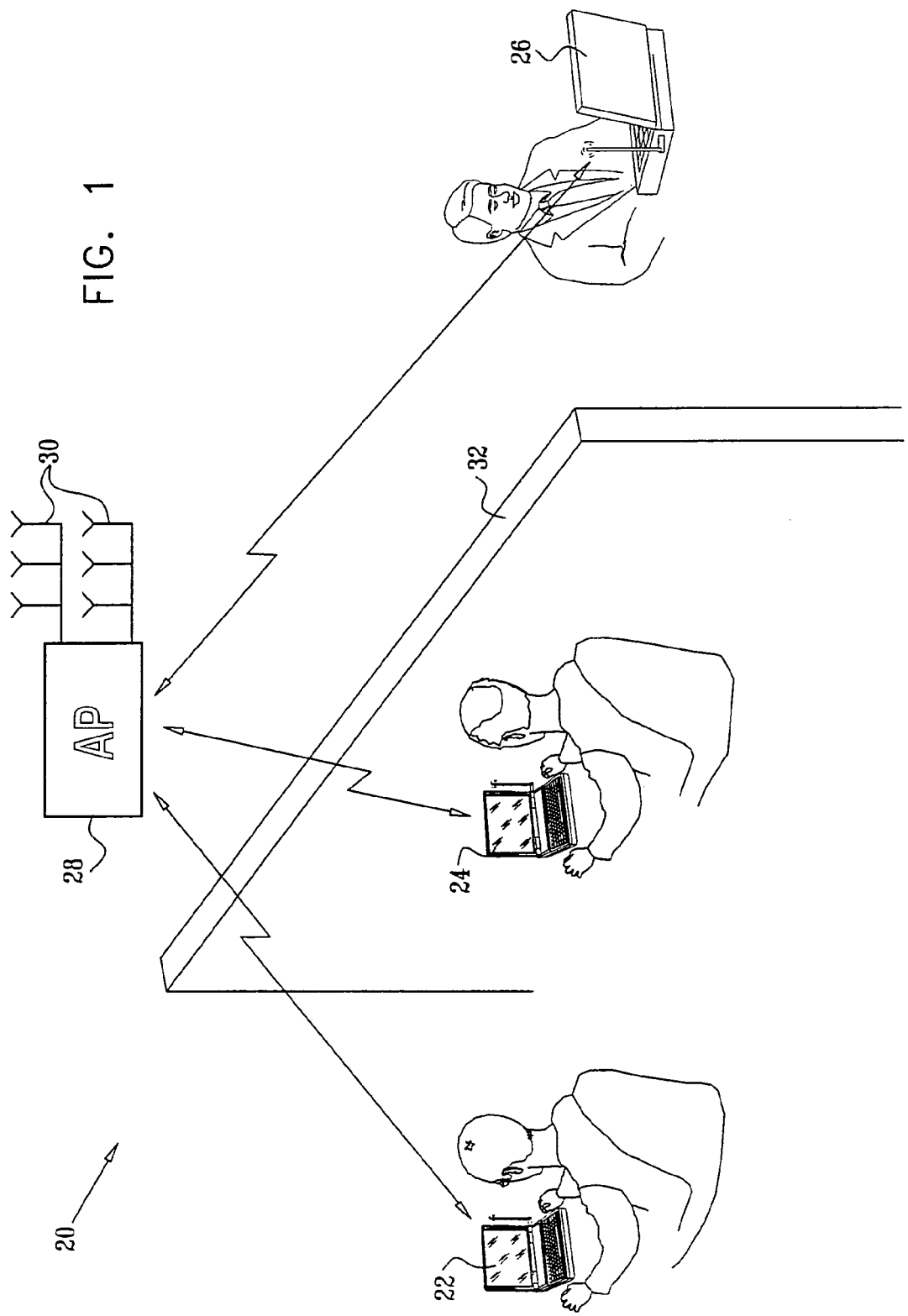
FIG. 1 is a schematic, pictorial illustration of a WLAN with contention resolution, in accordance with an embodiment of the present invention.

FIG. 1 is a block diagram that schematically illustrates a wireless LAN (WLAN) 20, in accordance with an embodiment of the present invention. System 20 comprises an access point 28, which communicates with mobile stations 22, 24, 26, on a given frequency channel via one or more antennas 30. The mobile stations typically comprise computing devices, such as desktop, portable or handheld devices. Although for the sake of simplicity, only three mobile stations are shown in the figure, in practice access point 28 may handle a larger number of mobile stations simultaneously. The access point comprises an array of antennas 30, which permit the access point to apply spatial diversity processing and to perform spatial division multiplexing (SDM) among the mobile stations, as described hereinbelow. Although for the sake of simplicity, only a single access point is shown in FIG. 1, WLAN 20 typically comprises multiple access points, and the present invention may be implemented in some or all of these access points.

In the exemplary embodiments described hereinbelow, it is assumed that the access points and mobile stations communicate with one another in accordance with one of the standards in the IEEE 802.11 family and observe the 802.11 physical (PHY) layer and medium access control (MAC) layer conventions. Details of the 802.11 PHY and MAC layers are described in ANSI/IEEE Standard 802.11 (1999 Edition), and specifically in Part 11: *Wireless LAN Medium Access Control (MAC) and Physical Layer (PHY) Specifications*, which is incorporated herein by reference. The principles of the present invention, however, are not limited to the 802.11 standards, and may likewise be applied to other types of WLANs, as well as to other packet-based wireless communication systems.

According to the 802.11 standard, before beginning transmission on the frequency channel of access point 28, mobile stations 22, 24, 26 are supposed to use the above-mentioned CCA mechanism in order to verify that no other mobile station has already begun a transmission on the channel. Thus, if mobile station 24 detects a transmission by mobile station 22, for example, it is supposed to back off and refrain from transmitting for a certain period of time. In the pictured embodiment, however, mobile station 26 is separated by a barrier 32, such as a wall, from mobile stations 22 and 24, and may therefore fail to detect a transmission in progress by one of the other mobile stations, and vice versa. Furthermore, the CCA mechanism does not prevent mobile stations 22 and 24 from beginning transmission at approximately the same time. In embodiments of the present invention, access point 28 is capable of separately detecting and decoding the simultaneous signals from two or more mobile stations (such as mobile stations 22, 24, 26 in FIG. 1), using techniques described hereinbelow. These techniques may be used in conjunction with the standard CCA mechanism. Alternatively, the requirement for CCA and transmission back-off may be relaxed or eliminated entirely in network 20, based on the ability of access point 28 to detect and decode multiple signals simultaneously.

FIG. 2A is a timing diagram that schematically illustrates data packets 40 and 42 that may be received simultaneously by access point 28 over network 20, in accordance with an embodiment of the present invention. Each of packets 40 and 42 comprises a preamble 44, a header 46 and payload data 48. The 802.11 standards dictate different lengths of the preamble and header sections. The 802.11a and g standards, for example, mandate a preamble length of 16 μs and a 4 μs header, while 802.11b packets may have either a 72 μs "short preamble" with a 24 μs header, or a 144 μs "long preamble" with a 48 μs header. In this example, it is assumed that packets 40 and 42 have the same preamble and header lengths. The length of payload data 48 may vary from packet to packet in any case.

FIG. 2B is a timing diagram that schematically illustrates data packets 50 and 52 that may be received simultaneously by access point 28 over network 20, in accordance with another embodiment of the present invention. In this example, it is assumed that network 20 operates in accordance with the 802.11g standard, but includes at least one 802.11b mobile station, for example, mobile station 22. Thus, packet 50 is transmitted by mobile station 22 with a "short" (72 μs) preamble 54 and header 56 (24 μs) in accordance with the 802.11b standard, followed by data payload 58. Packet 52 is transmitted by mobile station 26, for example, according to 802.11g with a 16 μs preamble 60 and 4 μs header 62, followed by data payload 64. The lengths of preamble 60 and header 62 are exaggerated in the figure for clarity of illustration. Note that although the preamble of packet 50 starts before packet 52, header 62 starts before header 54.

Access point 28 is able to separate packet 40 from packet 42, and similarly to separate packet 50 from packet 52, based on the packet preambles and headers. Although preambles 44 of packets 40 and 42 are identical in most cases (since in most cases the signals are of the same type), the headers are likely to differ and thus supply some resolving information. It is also helpful that the headers are typically transmitted, according to the applicable standards, with low modulation rates, making it easier for the access point to decode them, relative to the data part of the packet. The headers are also typically protected by an error detection mechanism, which enables the access point to verify that it has decoded the headers correctly. For example, the 802.11b header includes a 24-bit cyclic redundancy code (CRC), which permits the access point to detect decoding errors with high sensitivity and low probability of false alarms. The 802.11a and g headers are protected by a parity bit. Moreover, not all header field values are valid, according to the current standards. Therefore, the values of decoded header fields may be checked for validity in order to provide further verification of correct header decoding.

Overview of Access Point Operation

Figure 3:
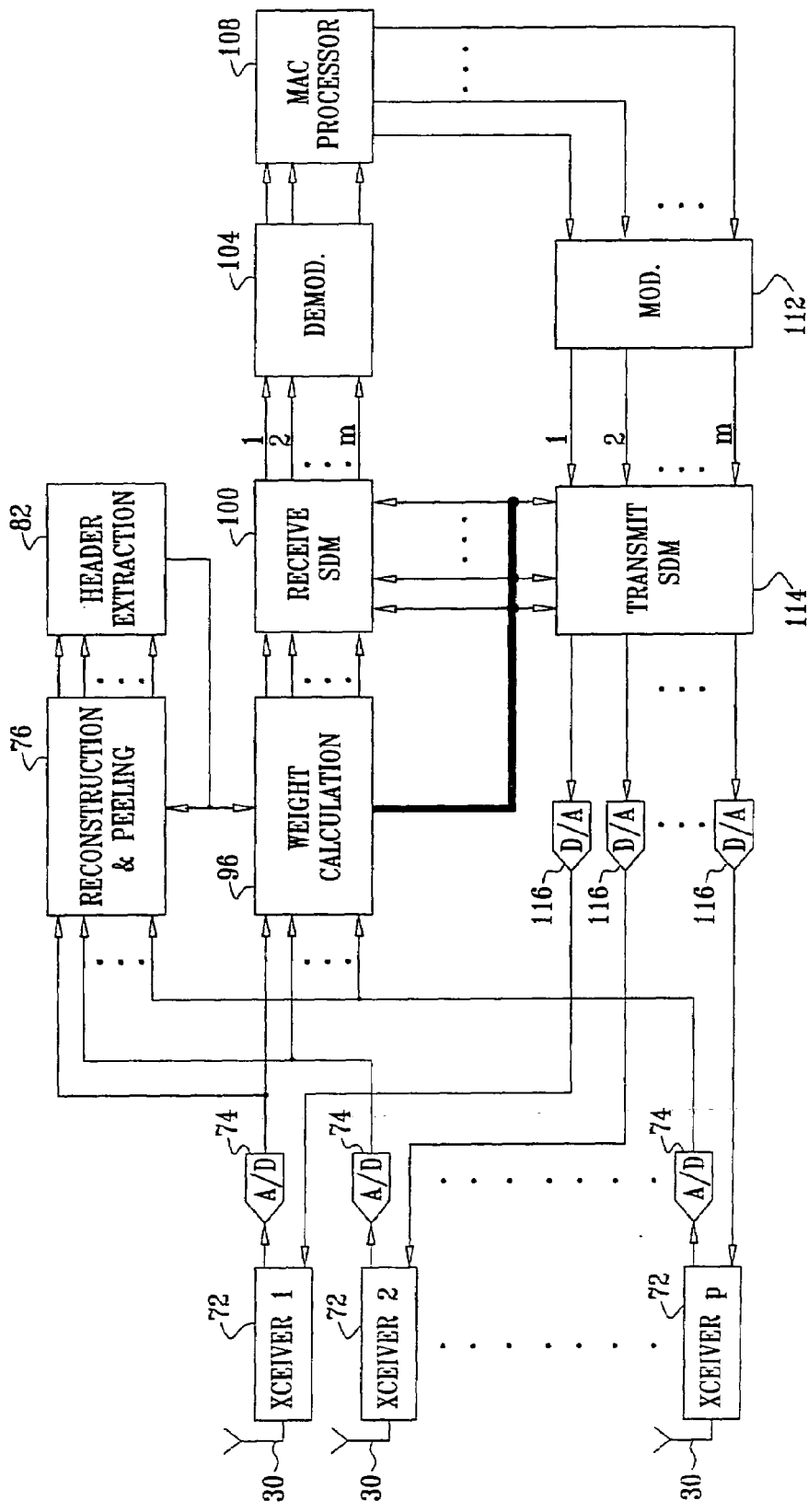
FIG. 3 is a block diagram that schematically shows elements of an access point in a WLAN, in accordance with an embodiment of the present invention.
Figure 4:
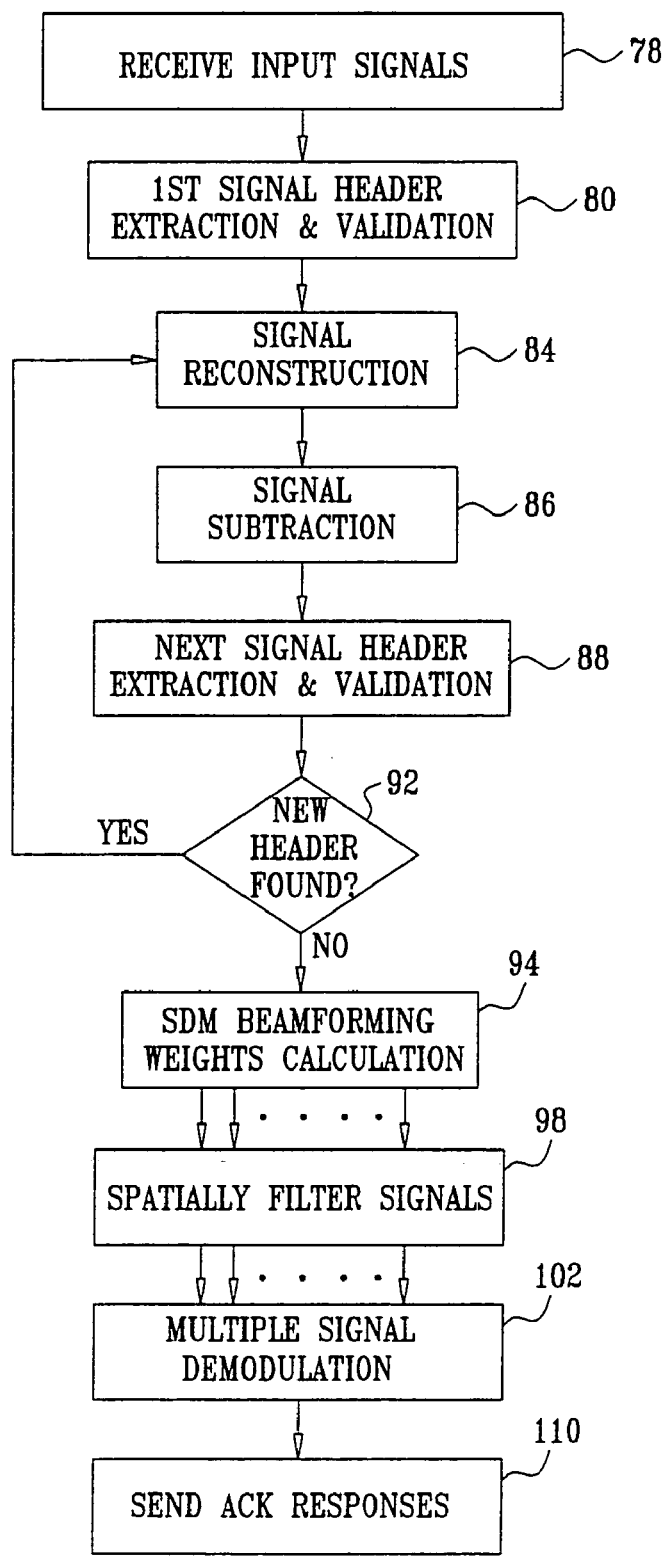
FIG. 4 is a flow chart that schematically illustrates a method for receiving signals in a WLAN, in accordance with an embodiment of the present invention.

Reference is now made to FIGS. 3 and 4, which schematically illustrate methods and circuits for processing signals in access point 28, in accordance with an embodiment of the present invention. FIG. 3 is a block diagram showing functional elements of signal processing circuitry used in access point 28, while FIG. 4 is a flow chart showing a signal processing method performed by the access point. Typically, the functional elements shown in FIG. 3 are implemented in one or more custom or semi-custom integrated circuits. Alternatively or additionally, some or all of these elements may be implemented in software on a suitable microprocessor or digital signal processor (DSP) device, or may be implemented in hard-wired logic using discrete circuit components. The elements of access point 28 that are shown in FIG. 3 are divided into certain functional blocks for the sake of conceptual clarity. It will be apparent to those skilled in the art, however, that in practice the operations of these blocks may be grouped together or separated into sub-blocks, depending on implementation considerations. All such implementations are considered to be within the scope of the present invention.

As shown in FIG. 3, each of antennas 30 is connected to a respective radio transceiver 72, wherein access point 28 comprises p antennas and p transceivers. In an exemplary embodiment, p=6, although smaller or larger numbers of antennas and transceivers may similarly be used. In the receive path, each transceiver 72 down-converts the radio-frequency (RF) signal received by the corresponding antenna 30 to baseband. An analog/digital (A/D) converter 74 then converts the baseband signal to a stream of digital samples. Alternatively, the transceiver may generate intermediate-frequency (IF) signals, which are then digitized and down-converted to baseband by a suitable digital processor. Further alternatively or additionally, some or all of the digital functions of the signal processing circuitry described below may be performed in the analog domain. The elements of FIGS. 3 and 4 will now be described briefly, to be followed by a more detailed description hereinbelow.

A reconstruction & peeling unit 76 receives the individual antenna signals in the form of p digital sample streams, at an input step 78 (FIG. 4). At this initial iteration, unit 76 does not process the signals, but rather forwards the p signals substantially without change as inputs to a header extraction unit 82. Unit 82 then attempts to extract a first header from the signals, at a first header extraction step 80. If a header is extracted, unit 82 also verifies that the header was correctly decoded, by checking validity of one or more fields in the header. If a header is successfully extracted and found valid, unit 82 passes the header back to reconstruction and peeling unit 76, as well as to a weight-calculation processor 96, for further processing.

Upon receiving the extracted header from unit 82, the reconstruction and peeling unit attempts to reconstruct the signal from which the extracted header originated, at a signal reconstruction step 84. The object of this reconstruction is to form a signal as similar as possible to the original signal from which the detected header was derived. The reconstructed signal, in the form of a sequence of synthesized digital signal values is then subtracted From each of the streams of input samples, in a peeling step 86, in order to reveal other signals that may have been transmitted simultaneously with the first signal detected.

The modified sample streams following the subtraction are fed back to header extraction unit 82, which attempts to detect and decode a second header in the sample streams, at a next header extraction step 88. The operations performed at this step are similar to those that were performed at step 80. Unit 82 determines whether a second header has been found, at a new header assessment step 92. If not, unit 76 concludes that the signals received at step 78 contained only a single data packet, and proceeds to complete the processing of this packet, as described below. If a second header is found, however, unit 76 may repeat reconstruction step 84 using the second header, and may then proceed again through steps 86 and 88 in an attempt to extract yet a third header. Further iterations of steps 84 through 92 may continue in this manner, depending on the system configuration and signal quality.

Based on the characteristics of the reconstructed signals, a weight calculation unit 96 calculates beamforming weights for spatial domain multiplexing (SDM), at a weight calculation step 94. These weights are used by a receive SDM unit 100, in order to filter the p sample streams provided by A/D converters 74, at a spatial filtering step 98. (Alternatively, in some embodiments, as described below, header extraction unit 82 itself performs a beamforming function, in which case the results of this function may be used by the weight calculation and receive SDM units.) The purpose of step 98 is to separate the input sample streams into up to m spatially-filtered sample streams, each representing the signal transmitted by one of mobile stations 22, 24, 26. A bank of m demodulators 104 demodulates the m (or fewer) filtered sample streams, at a demodulation step 102, in order to decode the packets for which headers were found.

The next step in packet processing by access point 28 is medium access control (MAC) protocol processing, which is carried out by a MAC processor 108, as dictated by the 802.11 standard. MAC-level processing is for the most part beyond the scope of the present patent application, with the exception of acknowledging receipt of the packets transmitted by mobile stations 22, 24, 26, at an acknowledgment (ACK) step 110. The 802.11 standards require that the access point acknowledge each uplink packet from a mobile station within a specified, short period after receiving the last bit of the uplink packet, typically within 10 μs for 802.11b or 16 μs for 802.11a or 802.11g.

Therefore, at step 110, MAC processor 108 outputs up to m ACK packets, which it feeds to m modulators 112. The output sample streams generated by modulators 112 may be filtered by a transmit SDM unit 114, which processes the sample streams using the beamforming weights computed by unit 96. Unit 114 typically applies the same weights as were applied by unit 100. However, it can alternatively apply different weights, tailored for the transmission path. Unit 114 thus generates p streams of beamformed samples, which are converted to analog signals by digital/analog (D/A) converters 116. The analog signals are fed to transceivers 72 for transmission via antennas 30 back to the mobile stations.

A number of the key elements and steps shown in FIGS. 3 and 4 will now be described in detail.

Header Extraction

Header extraction unit 82 performs several tasks:

Detection—determining that a packet is present in the sample stream received by the demodulator.

Synchronization—recovering the timing synchronization of the packet.

Decoding—extracting the data bits of the header from the modulated signal.

Validation—checking validity of the extracted headers.

Selection—(in some embodiments) choosing one header for subsequent processing if more than one header is detected in a given iteration.

Three alternative methods for carrying out these functions are shown below in FIGS. 5A, 5B and 5C, respectively:

Multi-antenna combining

Antenna diversity

Beam pattern diversity

Further methods of signal processing that may be used for header extraction will be apparent to those skilled in the art.

Multi-Antenna Combining

FIG. 5A is a block diagram that schematically shows details of header extraction unit 82, in accordance with an embodiment of the present invention that is based on multi-antenna combining. In this embodiment, a multi-antenna correlator 120 is used to detect the preamble or a packet that is received by antennas 30, and thus to recover the packet timing, as well. The correlation results are used as input to a weight calculation block 122, which determines weights to be used by a beamforming unit 124 in combining the p input streams into a single stream containing the detected signal. A demodulator 126 then extracts the header from this combined sample stream. A header validation unit 128 checks validity of the extracted header, typically by checking the parity bit or CRC, and optionally by checking certain particular header fields, such as the "rate" field, to ensure that they have acceptable values.

The detection step is based on correlating a sample vector corresponding to a known preamble, as given by the applicable 802.11 standard, with the sample streams from the antennas. To best utilize the antenna array, correlator 120 performs a multi-antenna correlation method. The multi-antenna correlator may operate by finding the correlation:

$$C_1(n) = \|X(n)d^H\|^2 \quad (1)$$

Here d is a row vector of samples corresponding to the known preamble, or a selected part of it, and the superscript H represents the transpose-conjugation operator (i.e., forming the hermitian conjugate). X(n) is the reception matrix at time instant n, given by the input sample stream from antennas 30, as follows:

$$x(n) = \begin{bmatrix} x_1(n) & x_1(n+1) & \ldots & x_1(n+N-1) \\ x_2(n) & x_2(n+1) & \ldots & x_2(n+N-1) \\ \vdots & \vdots & & \vdots \\ x_p(n) & x_p(n+1) & \ldots & x_p(n+N-1) \end{bmatrix} \quad (2)$$

wherein $x_i(n)$ is the sample taken at instant n from antenna i, and N is the length (in samples) of the known preamble or the selected part of it. The correlation may be performed simultaneously for two or more different preamble vectors d, corresponding to the different types of preambles that may coexist in network 20 (for example, in 802.11g networks, the "short" and "long" 802.11b preambles, as well as the 802.11g preamble). For example, the vector d may comprise the long preamble (or part of it) in the case of 802.11g or 802.11a, or a suitably chosen segment of the preamble in the case of 802.11b. The approach represented by equation (1) is computationally simple and works well when system 20 is characterized by a good signal/noise ratio and at least a moderate power difference between the signals received at access point 28 from the different mobile stations.

Alternatively, the following correlator may be used:

$$C_2(n) = dX^H(n)R_{XX}^{-1}(n)X(n)d^H \quad (3)$$

Here $R_{XX}(n) = X(n)X^H(n)$ is the estimated covariance matrix of the reception matrix at sampled time index n. This approach is more powerful than the one described by $C_1$, since it has the ability to spatially filter interfering signals, but it requires that correlator 120 invert the estimated covariance matrix in real time.

Using either equation (1) or equation (3), correlator 120 determines that it has detected a packet only if the correlation C is greater than a certain threshold. The threshold is typically determined heuristically, by balancing the objective of achieving a high rate of packet detection with a low rate of "false alarms" (erroneous detection of a packet when none was actually received), which waste processing power when no packet is actually detectable. The threshold may be set to a lower value in conditions of low signal/noise ratio, and to a higher value when the signal/noise ratio is higher. Once a correlation peak is found to be above the threshold, it is assumed that a packet has been detected. The value of n that gives the highest correlation peak (denoted by ñ) is taken to indicate the beginning of the packet preamble, thus acquiring synchronization. In other words, $$\tilde{n} = \underset{n}{\operatorname{argmax}}(C(n));$$

n=0, 1, 2, ..., $n_{max}$, wherein $n_{max}$ determines the limited range of samples over which the search is performed.

Once the preamble location has been found by correlator 120, weight calculation block 122 uses the packet timing to find a vector of beam weights:

$$w_1 = X(\tilde{n})d^H \quad (4)$$

The peak correlation and timing may also be determined by spatio-temporal processing. For this purpose, the detection matrix X is rearranged in spatio-temporal block-Toeplitz form—$\tilde{X}$, defined as:

$$\tilde{x}(n) = \begin{bmatrix} x_1(n) & x_1(n+1) & \ldots & x_1(n+N-1) \\ x_1(n-1) & x_1(n) & \ldots & x_1(n+N-2) \\ \vdots & \vdots & & \vdots \\ x_1(n-L+1) & x_1(n-L+2) & \ldots & x_1(n+N-L) \\ \hline x_2(n) & x_2(n+1) & \ldots & x_2(n+N-1) \\ x_2(n-1) & x_2(n) & \ldots & x_2(n+N-2) \\ \vdots & \vdots & & \vdots \\ x_2(n-L+1) & x_2(n-L+2) & \ldots & x_2(n+N-L) \\ \hline \vdots & \vdots & & \\ \hline x_p(n) & x_p(n+1) & \ldots & x_p(n+N-1) \\ x_p(n-1) & x_p(n) & \ldots & x_p(n+N-2) \\ \vdots & \vdots & & \vdots \\ x_p(n-L+1) & x_p(n-L+2) & \ldots & x_p(n+N-L) \end{bmatrix} \quad (5)$$

Here L is the number of temporal degrees of freedom in the computation.

Beamforming unit 124 applies the weights determined by equation (4) to the input sample streams from antennas 30 (as represented by X) in order to generate a spatially-filtered sample stream y, given by:

$$y = w_1^H X \quad (6)$$

This sample stream approximates the stream of samples that would have been received from the mobile station that generated the detected packet preamble, in the absence of other, interfering transmissions. Here, X denotes the reception matrix of all time samples necessary to cover at least the portion of the signal including the preamble and header. Demodulator 126 demodulates the beamformed signal given by y and extracts the packet header.

For more robust decoding, block 122 may implement the following formula in place of equation (4):

$$w_2 = R_{XX}^{-1}(\tilde{n})X(\tilde{n})d^H \quad (7)$$

This solution has the ability to null coexisting interfering signals. If equation (3) was used by correlator 120 in the detection step, then the covariance matrix $R_{XX}$ has already been computed and inverted, so that there is minimal added computational cost in finding $w_2$ in this manner. Note also that equations (6) and (7) may be recast in the block-Toeplitz spatio-temporal form given by equation (4).

Antenna Diversity

FIG. 5B is a block diagram that schematically shows details of header extraction unit 82, in accordance with an alternative embodiment of the present invention, which uses the antenna diversity approach. In this embodiment, the output of each of antennas 30 (following transceiver 72 and A/D converter 74) is input directly to a corresponding demodulator in a demodulator bank 132. The antenna outputs may be hard-wired directly to the corresponding demodulators. Alternatively, a subset of k<p antenna outputs may be coupled, by switches 131 in an antenna-selection unit 130, to corresponding demodulators, reducing the number of demodulators needed for this task. Each of the demodulators in bank 132 attempts to detect a packet in the signal received by its corresponding antenna. The demodulators may use a correlation method similar to that represented by equation (1) or (3) above, except that in this case the correlator receives samples from only a single antenna as input.

If successful in detecting a packet, the demodulator then synchronizes on the packet preamble and decodes the packet header. A header validation and selection unit 134 verifies that the extracted header is valid. If two or more demodulators successfully decoded different headers, header selection logic in unit 134 selects one of the headers to be used in subsequent processing. Operation of the header selection logic is described in greater detail hereinbelow.

Beam Diversity

FIG. 5C is a block diagram that schematically shows details of header extraction unit 82, in accordance with a further embodiment of the present invention, using beam diversity. In the beam diversity approach, a beamforming unit 136 combines the sample streams from antennas 30 in a number of different weighted combinations, in order to generate k beamformed sample streams. In this embodiment, k can be greater than p, meaning that there are more beamformed outputs than antenna inputs. Each of the sample streams is generated by weighting the antenna outputs by respective beamforming coefficients, using multipliers 137, and then summing the results using adders 138. The beamforming coefficients used in unit 136 may be selected arbitrarily, or they may be chosen so as to generate a particular set of spatial patterns. These patterns may be designed, for example, so that each output of unit 136 corresponds to a combined beam pattern that covers a different spatial region in the service area of access point 28. (Thus, assuming mobile stations 22, 24, 26 to be reasonably spaced apart or, more generally, to have sufficiently distinct spatial signatures, each of the sample streams generated by unit 130 could cover the area of a different mobile station.)

The outputs of unit 130 are processed by demodulator bank 132 as described above. As in the preceding embodiment, those of the demodulators that are successful in detecting a packet and decoding the packet header output the headers to header validation and selection unit 134. As noted above, when unit 134 detects more than one valid header, it selects one of the headers for use as the basis for subsequent packet processing. Unit 134 may simply select one header arbitrarily. Typically, however, a more rational selection criterion is applied in order to cause the strongest signal to be chosen first. For example, logic 136 may apply "majority rule," and select the header that was decoded by the largest number of demodulators 132. Additionally or alternatively, logic 136 may apply a measure of quality in choosing one of the headers, such as the strength of the signal from which the header was derived, or a measure of the error rate that was encountered by demodulators 132 in decoding the signals. The greater the signal strength and the lower the error rate, the likelier it is that the header has been correctly decoded. Error rate measures that may be used for this purpose include, for example, a mean-square error or error vector magnitude computed by the decoder, or a cumulative error distance measure generated in Viterbi-type decoding applied by the demodulators.

Signal Reconstruction and Peeling

Figure 6A:
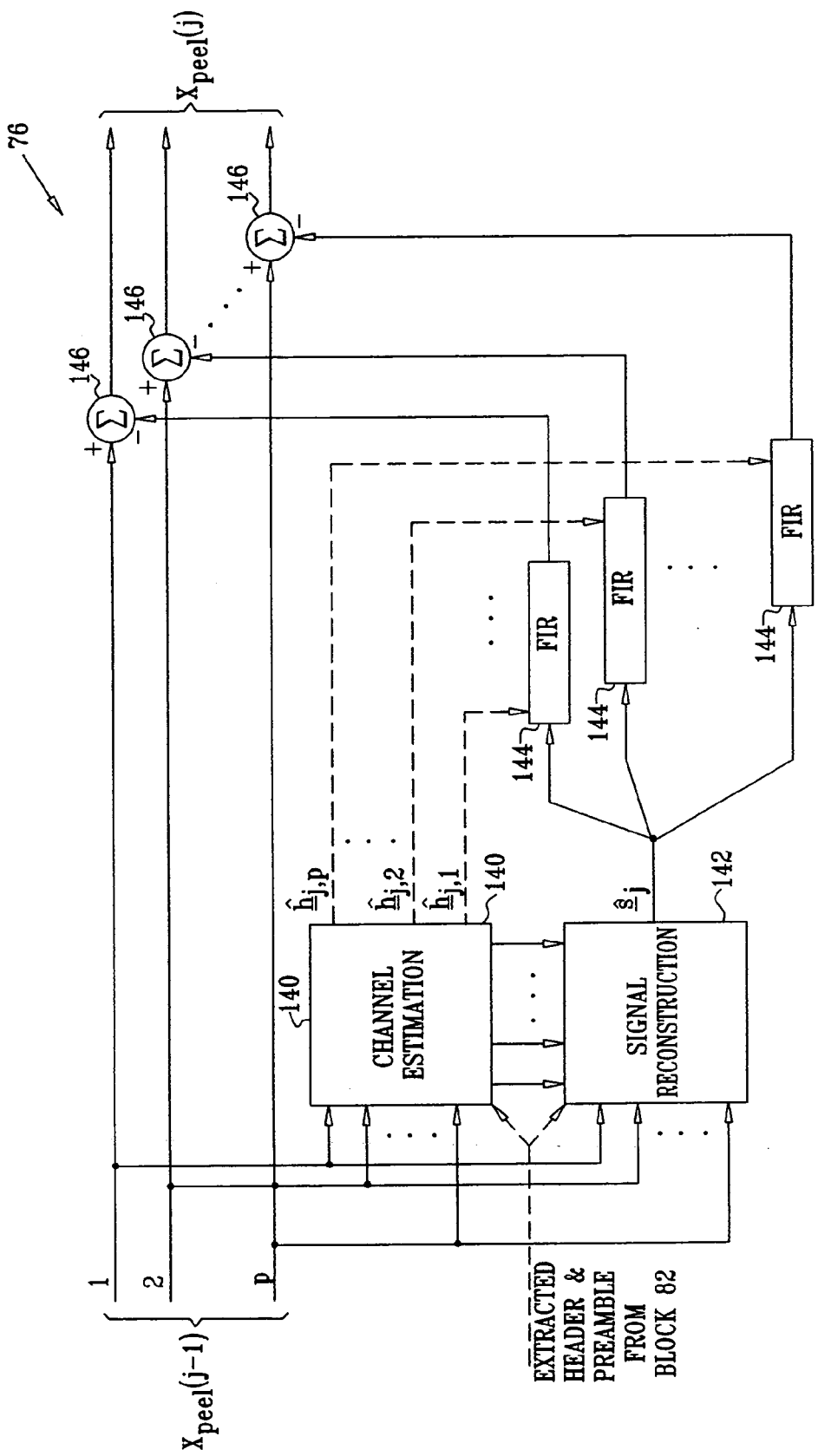
FIG. 6A is a block diagram that schematically illustrates a signal reconstruction and peeling unit used in an access point, in accordance with an embodiment of the present invention.

FIG. 6A is a block diagram that schematically shows details of reconstruction and peeling unit 76. As noted above, once a packet header has been decoded, the signal from which this packet was derived is reconstructed by unit 76 at step 84. The signal reconstruction is aimed at reconstructing the signal in the form in which it would have been received by access point 28, in the absence of other signals. This reconstructed signal (in the form of a stream of signal values) is subtracted from the original, input sample stream at step 86, in order to permit the access point to detect other (typically weaker) signals that were received simultaneously with the signal carrying the first packet to be decoded.

In order to reconstruct the first signal based on the decoded header, a signal reconstruction unit 142 generates a "clean" version of the estimated signal $\hat{s}_1$, as it would have been generated by the mobile station that transmitted the signal $s_1$, where sub-index 1 denotes the first extracted signal. More generally, unit 142 reconstructs the $j^{th}$ extracted signal by generating a "clean" version of the estimated signal $\hat{s}_j$, with respect to the transmitted signal $s_j$. (In the description that follows, the sub-index j is used variously to refer to the $j^{th}$ iteration through reconstruction step 84 and to the $j^{th}$ signal, received from the $j^{th}$ mobile station, which is reconstructed in the $j^{th}$ iteration.)

The estimated signal generally includes only the portion of the first packet—preamble, header and an initial portion of the data payload—that actually overlaps with the preamble and header of the second packet to be decoded. A sufficiently long portion of the first packet is used to cover the overlap with the preamble and header of the second packet with high probability. The signal values in $\hat{s}_j$ may be synthesized simply by applying the known modulation scheme of the packet to the decoded packet header and data. Alternatively, other methods of generating the estimated signal may be used, as described below.

A channel estimation unit 140 estimates the transfer function $H_j$ of the propagation channel between the mobile station that transmitted the $j^{th}$ signal and the access point:

$$H_j = \begin{bmatrix} h_{j,1} \\ h_{j,2} \\ \vdots \\ h_{j,p} \end{bmatrix} \quad (8)$$

Here $h_{j,i}$ is a row vector representing the discrete, finite-length transfer function of the channel from the $j^{th}$ mobile station to antenna i (or combined input beam i). An array of finite impulse response (FIR) filters 144 convolve the estimated transfer function $\hat{H}_j$ with the clean signal in order to form the reconstructed signal $\hat{H}_j * \hat{s}_j$, wherein * denotes convolution.

At the first iteration through step 86, an array of subtractors 146 subtract the reconstructed signal from the original signal, in the form of reception matrix X (or $X_{peel}(0)$), in order to generate the modified (or "peeled") signal $X_{peel}(1)$. At subsequent peeling iterations (if executed), subtractors 146 subtract the reconstructed signal from the last peeled signal from the preceding peeling iteration:

$$x_{peel}(j) = x_{peel}(j-1) - \begin{bmatrix} \hat{h}_{j,1} * \hat{s}_j \\ \hat{h}_{j,2} * \hat{s}_j \\ \vdots \\ \hat{h}_{j,p} * \hat{s}_j \end{bmatrix} \quad (9)$$

Channel Estimation

Channel estimation unit 140 estimates the channel transfer function $\hat{H}_j$ using the known preamble and header of the packet that has most recently been decoded by header extraction unit 82. Based on the decoded packet data and the known modulation scheme of the packet, the preamble and header form a vector $s_j$ of samples, referred to hereinbelow as the reference vector:

$$s_j = [s_j(1) s_j(2) \ldots s_j(N)] \quad (10)$$

Here, as before, the sub-index j denotes the $j^{th}$ extracted signal. A reference matrix $S_j$ is made up of an array of time-shifted replicas of the reference vector:

$$S_j = \begin{bmatrix} s_j(L) & s_j(L+1) & \ldots & s_j(N) \\ s_j(L-1) & s_j(L) & \ldots & s_j(N-1) \\ \vdots & \vdots & & \vdots \\ s_j(1) & s_j(2) & \ldots & s_j(N-L+1) \end{bmatrix} \quad (11)$$

The optimal choice of length L depends on the characteristic temporal spread of the channel.

Given a reference matrix of this sort, various methods may be used for estimating the channel response. The estimation is typically carried out individually for each antenna or combined (beamformed) input. For example, the channel response may be estimated from the correlation of the actual signal received by each antenna with the reference matrix:

$$\hat{h}_{j,i} = x_i(\tilde{n}_j) S_j^H \quad (12)$$

Here $x_i(\tilde{n}_j)$ is a row vector made up of the sequence of samples received on input i during the period of transmission of the signal $s_j$. Alternatively, for more robust estimation in the presence of interference, a minimum-mean-square-error solution may be found:

$$\hat{h}_{j,i} = x_i(\tilde{n}_j) S_j^H (S_j S_j^H)^{-1} \quad (13)$$

Further alternatively, frequency-domain channel estimation may be used. In this case, the approximate channel response may be estimated independently for each frequency bin. For this purpose, the frequency-domain representation of the channel for the $k^{th}$ frequency bin is estimated by:

$$\hat{h}_{j,i}(f_k) = x_i(f_k) s_j^H(f_k) (s_j(f_k) s_j^H(f_k))^{-1} \quad (14)$$

wherein $s_j(f_k)$ and $x_i(f_k)$ are the frequency-domain representations of vector $s_j$ and vector $x_i$, respectively, for frequency bin $f_k$. $x_i(f_k)$ is calculated by taking the Fast Fourier Transform (FFT) of vector $x_i$ and collecting the output samples from successive overlapped FFT frames in frequency bin $f_k$, into a row vector, to form the vector $x_i(f_k)$. Similarly, $s_j(f_k)$ is computed using successive FFT frames of $s_j$ in frequency bin $f_k$. The convolution of equation (9) is then replaced by simple bin-by-bin multiplication of the channel response by the estimated signal.

Signal Reconstruction

Several alternative methods may be used to derive the estimated signal $\hat{s}_j$ in signal reconstruction unit 142. As noted above, the estimated signal may simply be synthesized by re-modulating the decoded bits of the first packet according to the modulation scheme used by the transmitting mobile station. In 802.11 systems, the data modulation scheme can be determined from the decoded header, and the header modulation scheme can be determined from the preceding preamble.

Figure 6B:
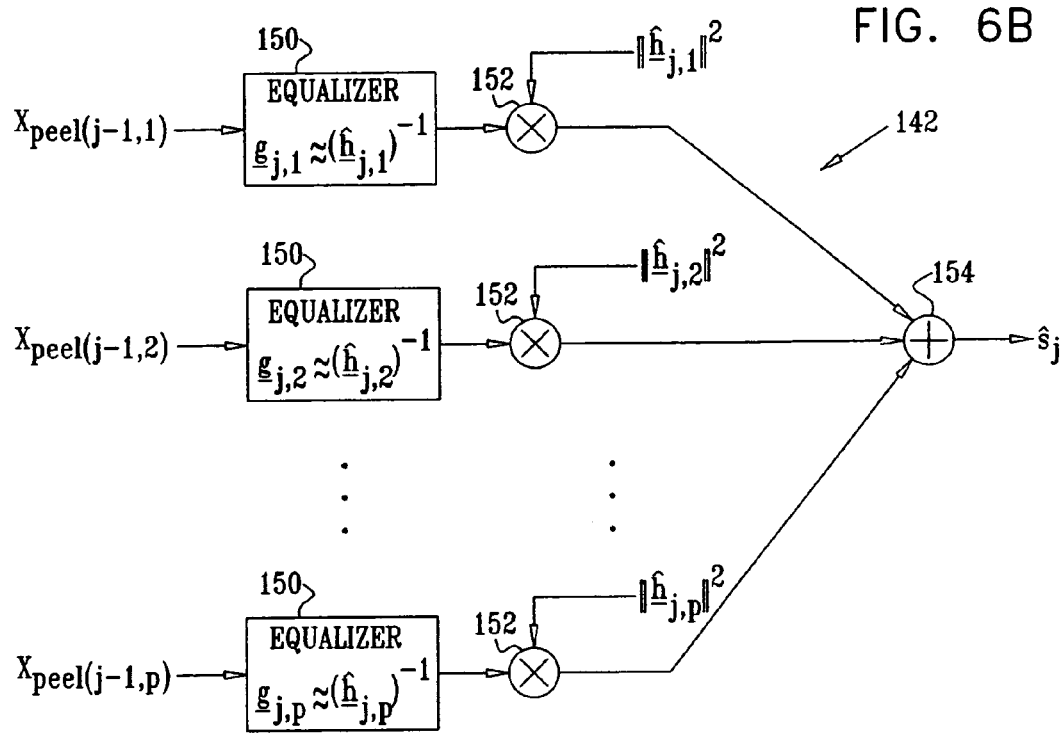
FIGS. 6B and 6C are block diagrams that schematically illustrate a signal reconstruction circuit used in the signal reconstruction and peeling unit of FIG. 6A, in accordance with embodiments of the present invention.

Alternatively, the estimated signal may be derived from the reception matrix X and the estimated transfer function $\hat{H}_j$ using a maximal ratio solution. Two maximal ratio solutions are described hereinbelow:
1. Pre-equalized maximal ratio combining
2. Post-equalized maximal ratio combining 1. Maximal Ratio Combining with Pre-Equalization FIG. 6B is a block diagram that schematically shows details of signal reconstruction unit 142, in accordance with an embodiment of the present invention that uses pre-equalized maximal ratio combining. The reconstructed signal is computed by equalizing the signal from each antenna in an equalizer 150. Each equalized signal is weighted by multiplication, at a multiplier 152, by the squared norm of the corresponding channel response. The signals are then combined by an adder 154 to give the maximal-ratio weighted total:

$$\hat{s}_j = \frac{1}{\|\hat{H}_j\|_F^2} \sum_{i=1}^{p} \|\hat{h}_{j,i}\|^2 \cdot g_{j,i} * x_i \quad (15)$$

Here $g_{j,i}$ is a function selected such that $g_{j,i} * h_{j,i} = \delta(0)$, for all i and j, wherein $\delta$ is the Kronecker delta function. $\|\hat{h}_{j,i}\|$ is the norm of the vector of the estimated temporal channel response at antenna i and $\|\cdot\|_F$ denotes the Frobenius norm. In other words, $g_{j,i}$ effectively equalizes the corresponding $h_{j,i}$.

In an alternative embodiment, this method is implemented in the frequency-domain. In this embodiment, the signal is reconstructed in each frequency bin individually using the bin-by-bin estimated channel response, as given by equation (14) above. For each frequency bin $f_k$, the reception vector of samples $x_i$ in equation (15) is replaced by the appropriate frequency-bin content $x_i(f_k)$, and the convolution is replaced by simple scalar division in each bin with the estimated channel transfer function $\hat{h}_{j,i}(f_k)$ for the appropriate bin:

$$\hat{s}_j(f_k) = \frac{1}{\|\hat{H}_j^f\|_F^2} \sum_{i=1}^{p} \|\hat{h}_{j,i}^f\|^2 \cdot \frac{x_i(f_k)}{\hat{h}_{j,i}(f_k)} \quad (16)$$

Here, $\hat{h}_{j,i}^f$ is the frequency-domain channel transfer function, at peeling iteration j and antenna i:

$$\hat{h}_{j,i}^f = [\hat{h}_{j,i}(f_1) \hat{h}_{j,i}(f_2) \ldots \hat{h}_{j,i}(f_K)] \quad (17)$$

$\hat{H}_j^f$ is the matrix of the frequency-domain channel transfer functions over all p antennas:

$$\hat{H}_j^f = \begin{bmatrix} \hat{h}_{j,1}^f \\ \hat{h}_{j,2}^f \\ \vdots \\ \hat{h}_{j,p}^f \end{bmatrix} = \begin{bmatrix} \hat{h}_{j,1}(f_1) & \hat{h}_{j,1}(f_2) & \ldots & \hat{h}_{j,1}(f_K) \\ \hat{h}_{j,2}(f_1) & \hat{h}_{j,2}(f_2) & \ldots & \hat{h}_{j,2}(f_K) \\ \vdots & \vdots & \ddots & \vdots \\ \hat{h}_{j,p}(f_1) & \hat{h}_{j,p}(f_2) & \ldots & \hat{h}_{j,p}(f_K) \end{bmatrix} \quad (18)$$

K is the total number of FFT frequency-bins in use, and $\|\hat{h}_{j,i}^f\|$ is the norm of the vector $\hat{h}_{j,i}^f$, over all frequency-bins.

It can be seen in equations (15) and (16) that the weighting of the different antennas is determined by the average power of the signal received at each antenna, taken over the entire bandwidth of the signal. Therefore, the antennas weighting is identical for all frequency bins.

2. Maximal Ratio Combining with Post-Equalization

Figure 6C:
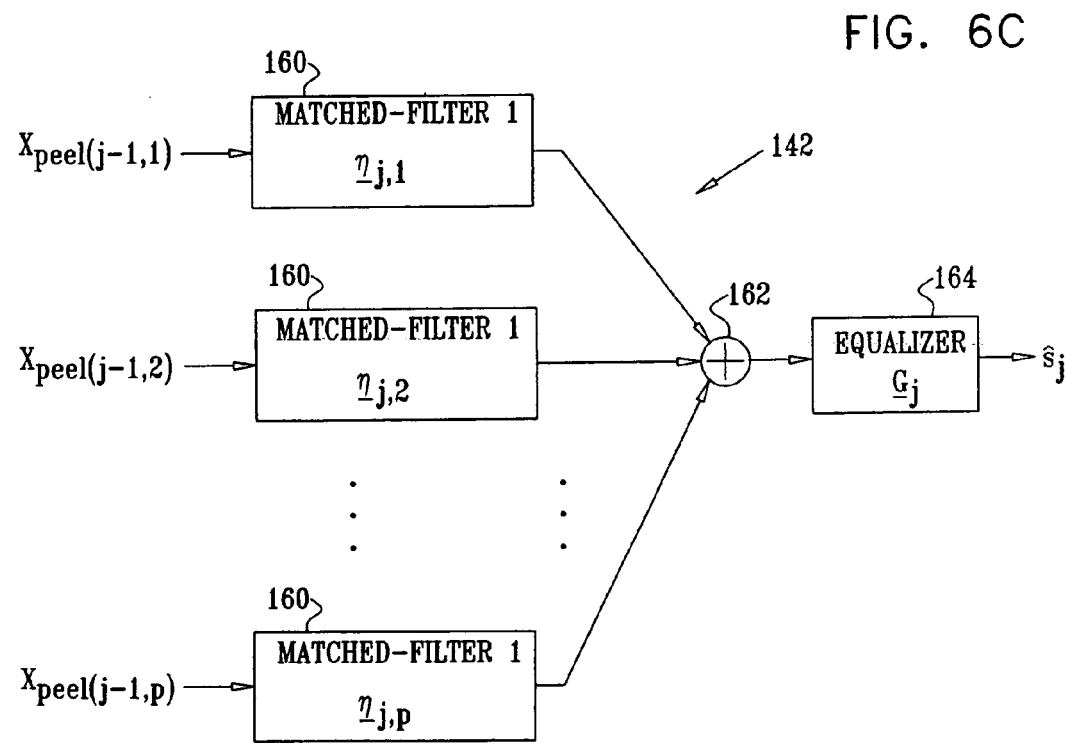

FIG. 6C is a block diagram that schematically shows details of signal reconstruction unit 142, in accordance with an alternative embodiment of the present invention, this time using post-equalized maximal ratio combining. In this embodiment, rather than equalizing each antenna separately, each antenna signal is first filtered, by a matched filter 160, with its own channel-matched response $\eta_{j,i}$, as given by:

$$\eta_{j,i}=[\eta_{j,i}(1)\eta_{j,i}(2) \ldots \eta_{j,i}(L)], \text{ such that } \eta_{j,i}(n)=\hat{h}_{j,i}^*(L+1-n); n=1, 2, \ldots, L \quad (19)$$

The individual filtered signals are combined by an adder 162 to give the sum $$\sum_{i=1}^{p} \eta_{j,i} * x_i,$$

which is then input to an equalizer 164. The reconstructed signal following the equalizer is given by:

$$\hat{s}_j = \left[\sum_{i=1}^{p} \eta_{j,i} * x_i\right] * G_j \quad (20)$$

Here, the convolution with $G_j$ represents the filter coefficients of equalizer 164, wherein:

$$G_j * \sum_{i=1}^{p} \eta_{j,i} * \hat{h}_{j,i} = \delta(0) \quad (21)$$

Ideally, the frequency response of $G_j$ is the inverse of the combined frequency response function $$\sum_{i=1}^{p} \eta_{j,i} * \hat{h}_{j,i},$$

if the inverse exists. In practice, the post-equalizer response attempts to approximate the inverse transfer function by minimizing:

$$\left\| G_j * \sum_{i=1}^{p} \eta_{j,i} * \hat{h}_{j,i} - \delta(0) \right\|^2 \quad (22)$$

In an alternative embodiment, this method may also be implemented in the frequency domain. The signal is reconstructed in each frequency bin individually using the bin-by-bin estimated channel response, as in equation (14). In each frequency bin $f_k$, the reception vector of samples $x_i$ is replaced by the appropriate frequency-bin content $x_i(f_k)$, and the convolution is replaced by simple scalar multiplication of the content of each frequency bin with the complex-conjugate of the channel transfer function $\hat{h}_{j,i}(f_k)$:

$$\hat{s}_j(f_k) = \frac{1}{\|\hat{h}_j(f_k)\|^2} \sum_{i=1}^{p} \hat{h}_{j,i}^*(f_k) x_i(f_k) \quad (23)$$

The post-equalization in this case is applied simply by normalizing the energy in each bin $f_k$ by the channel response gain $\|\hat{h}_j(f_k)\|^2$, over all p antennas, wherein:

$$\hat{h}_j(f_k)=[\hat{h}_{j,1}(f_k)\hat{h}_{j,2}(f_k) \ldots \hat{h}_{j,p}(f_k)]^T \quad (24)$$

Note that $x_i$ typically contains a greater number of samples $x_i(n)$ than were used in detecting the preamble of the first packet at step 80. The number of samples should be sufficient so that after the reconstructed signal is subtracted from the reception matrix (as given by equation (9)), the resulting modified reception matrix $X_{peel}$ will be long enough to permit decoding of the entire preamble and header of the second packet.

Signal Reconstruction by Beamforming

In still another embodiment (not shown in the figures) signal reconstruction unit 142 reconstructs the estimated signal ŝ by applying effective beamforming weights to the reception matrix, for example:

$$\hat{s}_j = R_{Xs}^H(\tilde{n}_j) R_{XX}^{-1}(\tilde{n}_j) X(\tilde{n}_j) \quad (25)$$

In this equation, the beamforming weights are determined by the auto-covariance matrix $R_{XX}$, as defined above, and the cross-covariance (i.e., the correlation $R_{Xs}=X(\tilde{n}_j)s_j^H$) of the reception matrix X, at time instant $\tilde{n}_j$, with the reference signal $s_j$. $\tilde{n}_j$ is the time index at which the first sample of reference signal $s_j$ is placed in the reception matrix X. For spatio-temporal processing, X may be replaced in equation (15) by its block-Toeplitz form—X̄, as defined above. As in the preceding embodiments, this method can also be applied in the frequency domain by replacing the reception matrix with the bin-by-bin frequency content of the signals.

Calculation of SDM Weights

Based on the signal headers extracted at steps 80 and 88, weight calculation unit 96 determines beamforming weights, at step 94. In some of the implementations described above, weights were already calculated as part of the header extraction and reconstruction process, and these weights may be reused at this stage. It is desirable, however, to recalculate the weights based on the actual, extracted headers in order to more accurately demodulate the packet payloads at step 102.

For the purpose of this calculation, a reference vector of samples $r_j$ is defined for each packet j (and for the corresponding signal that carried packet from the transmitting mobile station). $r_j$ typically contains the header portion of the corresponding reference vector $s_j$, as defined by equation (10), and may also contain at least a portion of the preamble, thus providing additional processing-gain. A weight vector $w_j$ for the $j^{th}$ extracted signal is then given by:

$$w_j = \arg\min_{w_j} \|w_j^H x(\tilde{n}_j) - r_j\|^2 \quad (26)$$

The reception matrix X in this case contains the samples received on all the inputs of access point 28 during the period of reception of $r_j$, and $\tilde{n}_j$ is defined as above. The solution to equation (26) is given by:

$$w_j = (X(\tilde{n}_j)X^H(\tilde{n}_j))^{-1} X(\tilde{n}_j) r_j^H \tag{27}$$

This solution is formally the same as equation (7) above, but now, being based on header information rather than the packet preamble alone, gives better signal separation. As above, X may be replaced by its block-Toeplitz form, in which case $w_j$ contains spatio-temporal filter coefficients.

Alternatively, the weight calculation may be performed in the frequency domain:

$$\underline{w}_j(f_k) = \arg\min_{\underline{w}_j(f_k)} \|\underline{w}_j^H(f_k)\chi(f_k) - \underline{r}_j(f_k)\| \tag{28}$$

wherein $\chi(f_k)$ $r_j(f_k)$ and are the frequency-domain representation of the reception matrix X and the reference vector $r_j$, respectively, in the $k^{th}$ frequency bin. $\chi(f_k)$ is obtained by applying the FFT on each of the rows of X. The FFT output samples of each row in X, from the $f_k$ frequency-bin, are collected from successive FFT frames into the appropriate row in $\chi(f_k)$. Similarly, the vector $r_j(f_k)$ is obtained from successive FFT frames of $r_j$, at the frequency-bin $f_k$. The minimizing solution for the frequency-domain weights is then given by:

$$w_j(f_k) = (\chi(f_k)\chi^H(f_k))^{-1}\chi(f_k)r_j^H(f_k) \tag{29}$$

Demodulating and Acknowledging the Signals

FIG. 7 is a timing diagram that schematically illustrates the steps of FIG. 4, as applied to processing of packets 40 and 42 (FIG. 2), in accordance with an embodiment of the present invention. The abbreviations S1 and S2 used in the figure refer to signal 1 (which carries packet 40) and signal 2 (which carries packet 42), respectively, while H1 and H2 refer to the headers of Si and S2. The numbering of the steps in the timing diagram corresponds to the step numbering used in FIG. 4. The time of completion of certain steps shown in FIG. 7, such as steps 80 and 102, is dependent on the time of arrival of the last bit in header 46 and payload 48. The remaining steps are timed in coordination with these packet-dependent steps, but the actual time duration allocated to each step in the figure is set arbitrarily for the sake of illustration.

As noted earlier, the 802.11 standard requires that acknowledgments be returned to the mobile stations that sent packets 40 and 42, at step 110, within a short time after access point 28 has received the last bit in each of the respective packets. In order to meet this requirement, it is necessary to complete the demodulation of each of packets 40 and 42, at step 102, within a few microseconds of the end of the packet. For this purpose, certain steps in the processing of packets 40 and 42 are performed in parallel, where possible. For example, access point 28 extracts header 46 from packet 42 at the same time as it calculates SDM beamforming weights for application to packet 40; and demodulation of the two packets similarly proceeds in parallel. Certain of the processing blocks shown in FIG. 3, such as weight calculation unit 96 may be duplicated for this purpose.

Input processing unit 76 buffers unprocessed samples as required until unit 96 has completed the weight calculations and provided the appropriate weights to SDM unit 100. The buffering and switching logic required for this purpose will be apparent to those skilled in the art, and is omitted from FIG. 3 for the sake of simplicity. As can be seen in FIG. 7, the beamforming weight calculation at step 94 for each packet can be completed only after access point 28 has received the entire packet header, as well as a substantial part of the data payload.

Therefore, in some embodiments of the present invention, in order to complete demodulation step 102 promptly after the last bit of the packet is received, demodulators 104 operate at an accelerated processing rate until the samples buffered by unit 76 have been exhausted. For example, the demodulators may operate at four times the sample rate. Typically, other processing units shown in FIG. 3 operate at this accelerated speed, as well. Thus, as shown in FIG. 7, demodulation step 102 is typically divided into two stages: an accelerated processing stage 170, until the buffer contents are exhausted; and a normal-rate processing stage 172, in which the demodulators operate on the fly, at the original sample rate, until the entire packet has been demodulated.

MAC processor 108 receives the digital data from demodulators 104, and generates an ACK packet in response to each uplink packet received by access point 28. Typically, the ACK packets are transmitted simultaneously, using SDM to direct the packets to the appropriate mobile stations. Alternatively, the ACK packets may be sent one after the other in succession, as long as both packets can be transmitted in this manner within the time limit imposed by the applicable standard.

In some conditions (such as high noise or fading) after subtracting the first packet header at step 86, header extraction unit 76 may extract the same packet header a second time at step 82. It is also possible that the duplicate header extracted at step 88 will differ slightly from the first header due to one or more bit errors, and that the error will not be detected by the header parity bit or CRC. MAC processor 108, however, will determine that the two headers contain the same MAC parameters (such as the MAC source address). In this case, the MAC processor will acknowledge only the first decoded packet and will discard the second, spurious packet. This MAC mechanism prevents multiple acknowledgments of the same packet even when the same packet is erroneously decoded multiple times.

As noted above, the weights determined by weight calculation unit 96 for each received packet may also be applied by transmit SDM unit 114 in generating the ACK signal to be transmitted in response to the packet. When access point 28 receives two or more packets simultaneously, different weights are determined for each of the received packets, and these different weights may be applied to the corresponding ACK signals. In this manner, it is possible to transmit two or more ACK signals simultaneously, by spatial multiplexing, to the different mobile stations that transmitted the uplink signals. Alternatively, transmit SDM unit 114 may use different weights from those used by receive SDM unit 100. In this case, weight calculation unit 96 calculates two sets of weights—one for reception and one for transmission. The transmit weights are then specifically designed for SDM transmission.

Simultaneous transmission of the ACK signals, however, imposes additional complexity on transmit SDM unit 114 and increases the probability that the receiving mobile stations will not be able to decode the ACK messages due to interference between the signals. Therefore, if time permits, it may be desirable to transmit the two (or more) ACK messages in succession, rather than simultaneously.

Although the embodiments described above sometimes refer explicitly to processing of two simultaneous packets, the principles and methods described above may be extended in a straightforward manner to reception and decoding of three or more simultaneously-received packets. Furthermore, whereas these embodiments refer specifically to aspects of the 802.11 standards, the principles of the present invention may similarly be applied to WLANs that operate according to other standards and to other sorts of wireless packet networks. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
receiving signals transmitted over the air by first and second mobile stations on a common frequency channel in a wireless packet network, the signals carrying first and second data packets transmitted by the first and second mobile stations, respectively, the first and second data packets comprising respective, first and second headers;
processing the received signals so as to identify the first header;
responsively to the identified first header, reconstructing signal values corresponding to at least a portion of the first data packet;
subtracting the reconstructed signal values from the received signals so as to produce a modified signal;
processing the modified signal in order to identify the second header; and
demodulating the first and second data packets using the identified first and second headers.

2. The method according to claim 1, wherein the network comprises a wireless local area network (WLAN), and wherein the signals are transmitted by the mobile stations to an access point in the WLAN in accordance with IEEE standard 802.11.

3. The method according to claim 1, wherein processing the received signals comprises:
detecting an element of the first packet in the received signals;
recovering a synchronization of the first packet responsively to the detected element; and
decoding at least a portion of the first header using the recovered synchronization.

4. The method according to claim 3, wherein detecting the element comprises detecting a preamble of the first packet.

5. The method according to claim 4, wherein detecting the preamble comprises finding a correlation between the received signals and a known pattern of the preamble, and wherein recovering the synchronization comprises locating a peak value of the correlation, and determining a timing of the preamble based on the peak value.

6. The method according to claim 5, wherein receiving the signals comprises digitizing the received signals so as to generate at least one sequence of digital samples, and arranging the digital samples in a reception matrix, and wherein finding the correlation comprises defining a vector corresponding to the known pattern of the preamble, and computing the correlation of the reception matrix with the vector.

7. The method according to claim 6, wherein finding the correlation comprises computing a covariance of the reception matrix.

8. The method according to claim 5, wherein the preamble belongs to one of a plurality of preamble types that are used in the WLAN, and wherein finding the correlation comprises correlating the received signals with each of the plurality of preamble types.

9. The method according to claim 4, wherein processing the modified signal comprises:
detecting the preamble of the second packet in the modified signal;
recovering the synchronization of the second packet responsively to the detected preamble of the second packet; and
decoding the second header using the recovered synchronization.

10. The method according to claim 3, wherein receiving the signals comprises receiving the signals using multiple antennas, which generate respective signal inputs responsively to the signals, and wherein decoding at least the portion of the first header comprises:
computing respective weights for the signal inputs responsively to the detected element and the recovered synchronization;
combining the signal inputs responsively to the respective weights in order to generate a combined signal; and
extracting the first header from the combined signal.

11. The method according to claim 1, wherein receiving the signals comprises receiving the signals using multiple antennas, which generate respective signal inputs responsively to the signals, and wherein processing the received signals comprises combining the signal inputs to generate a combined signal, and identifying the first header in the combined signal.

12. The method according to claim 11, wherein combining the signal inputs comprises assigning respective weights to the signal inputs, and summing the signal inputs responsively to the respective weights.

13. The method according to claim 12, wherein assigning the respective weights comprises computing the respective weights responsively to a correlation between the signals inputs and a known preamble of the first data packet.

14. The method according to claim 11, wherein combining the signal inputs comprises generating a plurality of different combined signals, and wherein processing the received signals comprises identifying respective headers in one or more of the different combined signals, and selecting one of the identified headers as the first header.

15. The method according to claim 1, wherein receiving the signals comprises receiving the signals using multiple antennas, and providing a plurality of signal inputs responsively to the signals received by the multiple antennas, and wherein processing the received signals comprises identifying respective headers in one or more of the signal inputs, and selecting one of the identified headers as the first header.

16. The method according to claim 15, wherein providing the plurality of signal inputs comprises receiving a respective one of the signal inputs from each of the antennas.

17. The method according to claim 15, wherein providing the plurality of signal inputs comprises applying a beamforming process to the signals received from the multiple antennas so as to generate the plurality of signal inputs, such that each of the signal inputs comprises a different weighted combination of the signals received from the multiple antennas.

18. The method according to claim 1, wherein reconstructing the signal values comprises:
   estimating original signal values generated by the first mobile station in transmitting at least the portion of the first data packet;
   estimating a transfer function of a propagation channel traversed by the signals; and
   filtering the original signal values responsively to the transfer function in order to determine the reconstructed signal values.

19. The method according to claim 18, wherein estimating the original signal values comprises finding a set of beamforming weights responsively to a correlation between the received signals and the first header, and applying the beamforming weights to the received signals.

20. The method according to claim 18, wherein receiving the signals comprises receiving the signals using multiple antennas, which generate respective signal inputs responsively to the signals, and wherein estimating the original signal values comprises finding a maximal ratio combination of the signal inputs responsively to the estimated transfer function.

21. The method according to claim 20, wherein estimating the transfer function comprises estimating a respective individual transfer function for each of the multiple antennas, and wherein finding the maximal ratio combination comprises equalizing each of the signal inputs responsively to the respective individual transfer function, and combining the equalized signal inputs.

22. The method according to claim 21, wherein combining the equalized signal inputs comprises weighting each of the equalized signal inputs responsively to the respective individual transfer function, and summing the weighted equalized signal inputs.

23. The method according to claim 20, wherein finding the maximal ratio combination comprises applying a respective matched filter to each of the signal inputs so as to generate filtered inputs, combining the filtered inputs, and equalizing the combined inputs responsively to the estimated transfer function.

24. The method according to claim 18, wherein receiving the signals comprises receiving the signals in multiple frequency bins, and wherein estimating the transfer function comprises finding a frequency-domain transfer function in each of the frequency bins, and wherein filtering the original signal values comprises filtering the original signal values in the frequency domain responsively to the frequency-domain transfer function.

25. The method according to claim 18, wherein estimating the transfer function comprises finding a correlation of the first header with the received signals.

26. The method according to claim 1, and comprising:
   responsively to the identified second header, reconstructing further signal values corresponding to at least a portion of the second data packet;
   subtracting the reconstructed signal values from the modified signal so as to produce a further modified signal; and
   processing the further modified signal in order to identify a third header of a third packet, which was transmitted by a third mobile station simultaneously with at least one of the first and second packets.

27. The method according to claim 1, wherein receiving the signals comprises receiving the signals using multiple antennas, which are configured to generate a plurality of signal inputs responsively to the signals, and wherein demodulating the first and second data packets comprises:
   computing first and second beamforming weights for application to each of the signal inputs;
   combining the signal inputs responsively to the first and second beamforming weights so as to generate first and second filtered signals; and
   processing the first and second filtered signals, respectively, so as to demodulate the first and second data packets.

28. The method according to claim 27, wherein computing the first and second beamforming weights comprises determining the first and second beamforming weights responsively to the first and second headers, respectively.

29. The method according to claim 27, wherein receiving the signals comprises sampling the signals at a predetermined sample rate, and wherein processing the first and second filtered signals comprises processing at least a part of the signals at an accelerated rate, which is greater than the sample rate, so as to complete demodulation of the first and second data packets within a predetermined time limit following transmission of each of the packets.

30. The method according to claim 29, and comprising returning respective acknowledgments to the first and second mobile stations within the predetermined time limit, responsively to having completed the demodulation of the data packets.

31. The method according to claim 27, and comprising:
   generating respective first and second acknowledgments, responsively to having demodulated the first and second data packets; and
   transmitting the first and second acknowledgments, subject to the first and second beamforming weights, to the first and second mobile stations.

32. Apparatus for communication, comprising:
   a radio receiver, which is adapted to receive signals transmitted over the air by first and second mobile stations on a common frequency channel in a wireless packet network, the signals carrying first and second data packets transmitted by the first and second mobile stations, respectively, the first and second data packets comprising respective, first and second headers; and
   signal processing circuitry, which is adapted to process the received signals so as to identify the first header, and responsively to the identified first header, to reconstruct signal values corresponding to at least a portion of the first data packet and to subtract the reconstructed signal values from the received signals so as to produce a modified signal, and which is further adapted to process the modified signal in order to identify the second header, and to demodulate the first and second data packets using the identified first and second headers.

33. The apparatus according to claim 32, wherein the network comprises a wireless local area network (WLAN), and the apparatus is adapted for use in an access point in the WLAN, and wherein the signals are transmitted by the mobile stations to the access point in accordance with IEEE standard 802.11.

34. The apparatus according to claim 32, wherein the signal processing circuitry is adapted to detect an element of the first packet in the received signals, to recover a synchronization of the first packet responsively to the detected element, and to decode at least a portion of the first header using the recovered synchronization.

35. The apparatus according to claim 34, wherein the element of the first packet detected by the signal processing circuitry comprises a preamble of the first packet.

36. The apparatus according to claim 35, wherein the signal processing circuitry is adapted to detect the preamble by finding a correlation between the received signals and a known pattern of the preamble, and is further adapted to locate a peak value of the correlation, and to determine a timing of the preamble based on the peak value.

37. The apparatus according to claim 36, and comprising an analog/digital converter, which is adapted to digitize the received signals so as to generate at least one sequence of digital samples, and wherein the signal processing circuitry is adapted to arrange the digital samples in a reception matrix, and to define a vector corresponding to the known pattern of the preamble, and to compute the correlation of the reception matrix with the vector.

38. The apparatus according to claim 37, wherein the signal processing circuitry is adapted to determine the correlation by computing a covariance of the reception matrix.

39. The apparatus according to claim 36, wherein the preamble belongs to one of a plurality of preamble types that are used in the WLAN, and wherein the signal processing circuitry is adapted to correlate the received signals with each of the plurality of preamble types.

40. The apparatus according to claim 35, wherein the signal processing circuitry is adapted to detect the preamble of the second packet in the modified signal, to recover the synchronization of the second packet responsively to the detected preamble of the second packet, and to decode the second header using the recovered synchronization.

41. The apparatus according to claim 34, and comprising multiple antennas, which generate respective signal inputs responsively to the signals, and wherein the signal processing circuitry is adapted to compute respective weights for the signal inputs responsively to the detected element and the recovered synchronization, and to combine the signal inputs responsively to the respective weights in order to generate a combined signal, and to extract the first header from the combined signal.

42. The apparatus according to claim 32, and comprising multiple antennas, which generate respective signal inputs responsively to the signals, and wherein the signal processing circuitry is adapted to combine the signal inputs to generate a combined signal, and to identify the first header in the combined signal.

43. The apparatus according to claim 42, wherein the signal processing circuitry is adapted to assign respective weights to the signal inputs, and to sum the signal inputs responsively to the respective weights.

44. The apparatus according to claim 43, wherein the signal processing circuitry is adapted to compute the respective weights responsively to a correlation between the signals inputs and a known preamble of the first data packet.

45. The apparatus according to claim 42, wherein the signal processing circuitry is adapted to generate a plurality of different combined signals, and to identify respective headers in one or more of the different combined signals, and to select one of the identified headers as the first header.

46. The apparatus according to claim 32, and comprising multiple antennas, wherein the signal processing circuitry is adapted to process a plurality of signal inputs responsively to the signals received by the multiple antennas, so as to identify respective headers in one or more of the signal inputs, and to select one of the identified headers as the first header.

47. The apparatus according to claim 46, wherein the signal processing circuitry is coupled to receive a respective one of the signal inputs from each of the antennas.

48. The apparatus according to claim 46, wherein the signal processing circuitry is adapted to apply a beamforming process to the signals received from the multiple antennas so as to generate the plurality of signal inputs, such that each of the signal inputs comprises a different weighted combination of the signals received from the multiple antennas.

49. The apparatus according to claim 32, wherein the signal processing circuitry is adapted to estimate original signal values generated by the first mobile station in transmitting at least the portion of the first data packet, to estimate a transfer function of a propagation channel traversed by the signals, and to filter the original signal values responsively to the transfer function in order to determine the reconstructed signal values.

50. The apparatus according to claim 49, wherein the signal processing circuitry is adapted to estimate the original signal values by finding a set of beamforming weights responsively to a correlation between the received signals and the first header, and applying the beamforming weights to the received signals.

51. The apparatus according to claim 49, and comprising multiple antennas, which generate respective signal inputs responsively to the signals, and wherein the signal processing circuitry is adapted to estimate the original signal values by finding a maximal ratio combination of the signal inputs responsively to the estimated transfer function.

52. The apparatus according to claim 51, wherein the signal processing circuitry is adapted to estimate a respective individual transfer function for each of the multiple antennas, and to find the maximal ratio combination by equalizing each of the signal inputs responsively to the respective individual transfer function, and combining the equalized signal inputs.

53. The apparatus according to claim 52, wherein the signal processing circuitry is adapted to weight each of the equalized signal inputs responsively to the respective individual transfer function, and to sum the weighted equalized signal inputs to determine the maximal ratio combination.

54. The method according to claim 51, wherein the signal processing circuitry is adapted to find the maximal ratio combination by applying a respective matched filter to each of the signal inputs so as to generate filtered inputs, combining the filtered inputs, and equalizing the combined inputs responsively to the estimated transfer function.

55. The method according to claim 49, wherein the radio receiver is operative to receive the signals in multiple frequency bins, and wherein the signal processing circuitry is adapted to estimate a frequency-domain transfer function in each of the frequency bins, and to filter the original signal values in the frequency domain responsively to the frequency-domain transfer function.

56. The apparatus according to claim 49, wherein the signal processing circuitry is adapted to estimate the transfer function by finding a correlation of the first header with the received signals.

57. The apparatus according to claim 32, wherein the signal processing circuitry is adapted, responsively to the identified second header, to reconstruct further signal values corresponding to at least a portion of the second data packet, to subtract the reconstructed signal values from the modified signal so as to produce a further modified signal, and to process the further modified signal in order to identify a third header of a third packet, which was transmitted by a third mobile station simultaneously with at least one of the first and second packets.

58. The apparatus according to claim 32, and comprising multiple antennas, which are configured to generate a plurality of signal inputs responsively to the signals, and wherein the signal processing circuitry is adapted to compute first and second beamforming weights for application to each of the signal inputs, to combine the signal inputs responsively to the first and second beamforming weights so as to generate first and second filtered signals, and to process the first and second filtered signals, respectively, so as to demodulate the first and second data packets.

59. The apparatus according to claim 58, wherein the signal processing circuitry is adapted to compute the first and second beamforming weights responsively to the first and second headers, respectively.

60. The apparatus according to claim 58, and comprising an analog/digital converter, which is operative to sample the signals at a predetermined sample rate, and wherein the signal processing circuitry is adapted to process at least a part of the first and second filtered signals at an accelerated rate, which is greater than the sample rate, so as to complete demodulation of the first and second data packets within a predetermined time limit following transmission of each of the packets.

61. The apparatus according to claim 60, and comprising transmission circuitry, wherein the signal processing circuitry is adapted to cause the transmission circuitry to return respective acknowledgments to the first and second mobile stations within the predetermined time limit, responsively to having completed the demodulation of the data packets.

62. The apparatus according to claim 58, and comprising transmission circuitry, wherein the signal processing circuitry is adapted to generate respective first and second acknowledgments, responsively to having demodulated the first and second data packets, and to cause the transmission circuitry to transmit the first and second acknowledgments, subject to the first and second beamforming weights, to the first and second mobile stations.

* * * * *